US012418368B2

(12) United States Patent
Chien

(10) Patent No.: US 12,418,368 B2
(45) Date of Patent: Sep. 16, 2025

(54) HYBRID AUTOMATIC REPEAT REQUEST (HARQ) CODEBOOK TRANSMISSION USING FEEDBACK

(71) Applicant: Purplevine Innovation Company Limited, Hong Kong (CN)

(72) Inventor: Chun-Che Chien, Hong Kong (CN)

(73) Assignee: Purplevine Innovation Company Limited, Hong Kong (CN)

( * ) Notice: Subject to any disclaimer, the term of this patent is extended or adjusted under 35 U.S.C. 154(b) by 439 days.

(21) Appl. No.: 17/914,344

(22) PCT Filed: Oct. 8, 2021

(86) PCT No.: PCT/CN2021/122709
§ 371 (c)(1),
(2) Date: Sep. 25, 2022

(87) PCT Pub. No.: WO2022/073483
PCT Pub. Date: Apr. 14, 2022

(65) Prior Publication Data
US 2023/0112147 A1   Apr. 13, 2023

Related U.S. Application Data

(60) Provisional application No. 63/168,278, filed on Mar. 31, 2021, provisional application No. 63/089,044, filed on Oct. 8, 2020.

(51) Int. Cl.
*H04L 1/1829* (2023.01)
*H04L 1/1867* (2023.01)
*H04W 72/11* (2023.01)

(52) U.S. Cl.
CPC .......... *H04L 1/1861* (2013.01); *H04L 1/1854* (2013.01); *H04L 1/1887* (2013.01); *H04L 1/1893* (2013.01); *H04W 72/11* (2023.01)

(58) Field of Classification Search
CPC ... H04L 1/1861; H04L 1/1854; H04L 1/1887; H04L 1/1893; H04L 1/1607;
(Continued)

(56) References Cited

U.S. PATENT DOCUMENTS

2021/0021382 A1*  1/2021  Chien .............. H04L 1/1861
2021/0160879 A1*  5/2021  Lin ................. H04W 72/0453
(Continued)

FOREIGN PATENT DOCUMENTS

CN         113286367      8/2021
WO    WO 2021/111424     4/2020

OTHER PUBLICATIONS

U.S. Appl. No. 62/939,319_Specification_Nov. 22, 2019 (Year: 2019).*
International Search Report and the Written Opinion Dated Jan. 6, 2022 From the International Searching Authority Re. Application No. PCT/CN2021/122709. (9 Pages).
(Continued)

Primary Examiner — Rushil P. Sampat

(57) ABSTRACT

A user equipment (UE) executes a hybrid automatic repeat request (HARQ) processing method to reduce HARQ-ACK payload by selecting semi persistent scheduling (SPS) physical downlink shared channels (PDSCHs) on a plurality of periodic SPS PDSCH resources and reporting HARQ-ACKs for the selected SPS PDSCHs. Alternatively, the UE reduces HARQ-ACK payload by reducing HARQ-ACK bits for SPS PDSCH occasions or for SPS PDSCHs. Alternatively, the UE reduces HARQ-ACK payload by skipping HARQ-ACK feedback, such as a HARQ-ACK codebook, for the SPS PDSCHs. The UE determines an adjusted slot or sub-slot location for transmission of a HARQ-ACK bit for an SPS PDSCH at slot or sub-slot n when a symbol in an original slot or sub-slot location for transmission of the HARQ-ACK bit for an SPS PDSCH is invalid or has collision.

70 Claims, 7 Drawing Sheets

(58) Field of Classification Search
CPC ... H04L 5/0055; H04L 1/1614; H04L 1/1812; H04L 1/1896; H04L 27/2602; H04L 5/001; H04L 5/0012; H04L 5/0026; H04L 5/0091; H04W 72/11; H04W 72/0413; H04W 72/21; H04B 7/0456
See application file for complete search history.

(56) References Cited

U.S. PATENT DOCUMENTS

| | | | | |
|---|---|---|---|---|
| 2021/0344448 | A1* | 11/2021 | Nogami | H04L 1/1887 |
| 2022/0095337 | A1* | 3/2022 | Wang | H04L 5/0053 |
| 2023/0006798 | A1* | 1/2023 | Lee | H04L 5/0055 |
| 2023/0021623 | A1* | 1/2023 | Andersson | H04W 72/23 |

OTHER PUBLICATIONS

Samsung, "Chairman's Notes of AI 7.2.6 Physical Layer Enhancements for NR URLLC", Ad-Hoc Chair (Samsung), 3GPP TSG RAN WG1 Meeting #99, Reno, NV, USA, Nov. 18-22, 2019, R1-1913577, 15 P., Nov. 22, 2019.

LG Electronics, "Summary on Maintenance of Other Aspects for URLL/1IOT", Moderator (LG Electronics), 3GPP TSG RAN WG1 Meeting #101, E- Meeting, May 25-Jun. 5, 2020, R1-2004035, 40 P., Jun. 5, 2020.

Ericsson, "HARG-ACK Enhancements for 1IoT/URLL", Ericsson, 3GPP TSG-RAN WG1 Meeting #102-e, E-Meeting, Aug. 17-28, 2020, R1-2005513, 6 P., Aug. 28, 2020.

CMCC, "Discussion on Scheduling and HARQ Management", CMCC, 3GPP TSG RAN WG1 Meeting #93, Busan, Korea, May 21-25, 2018, R1-1806368, 7 P., May 25, 2018.

* cited by examiner

HYBRID AUTOMATIC REPEAT REQUEST (HARQ) CODEBOOK TRANSMISSION USING FEEDBACK

RELATED APPLICATIONS

This application is a National Phase of PCT Patent Application No. PCT/CN2021/122709 having International filing date of Oct. 8, 2021, which claims the benefit of priority under 35 USC § 119 (c) of U.S. Provisional Patent Application Nos. 63/168,278 filed on Mar. 31, 2021 and 63/089,044 filed on Oct. 8, 2020. The contents of the above applications are all incorporated by reference as if fully set forth herein in their entirety.

FIELD AND BACKGROUND OF THE INVENTION

The present disclosure relates to the field of communication systems, and more particularly, to a HARQ processing method, a user equipment, and a base station.

Wireless communication systems, such as the third-generation (3G) of mobile telephone standards and technology are well known. Such 3G standards and technology have been developed by the Third Generation Partnership Project (3GPP). The 3rd generation of wireless communications has generally been developed to support macro-cell mobile phone communications. Communication systems and networks have developed towards being a broadband and mobile system. In cellular wireless communication systems, user equipment (UE) is connected by a wireless link to a radio access network (RAN). The RAN comprises a set of base stations (BSs) that provide wireless links to the UEs located in cells covered by the base station, and an interface to a core network (CN) which provides overall network control. As will be appreciated the RAN and CN each conduct respective functions in relation to the overall network. The 3rd Generation Partnership Project has developed the so-called Long Term Evolution (LTE) system, namely, an Evolved Universal Mobile Telecommunication System Territorial Radio Access Network, (E-UTRAN), for a mobile access network where one or more macro-cells are supported by a base station known as an eNodeB or eNB (evolved NodeB). More recently, LTE is evolving further towards the so-called 5G or NR (new radio) systems where one or more cells are supported by a base station known as a gNB.

In recent 3GPP standardization efforts, a work item (WI) of enhanced Industrial Internet of Things (IoT) and ultra-reliable and low latency communication (URLLC) support for NR has been revised and approved. The following issue has been identified as one of the objectives of the work item:

Study, identify and specify if needed, required Physical Layer feedback enhancements for meeting URLLC requirements covering UE feedback enhancements for HARQ-ACK.

HARQ-ACK may comprise a HARQ-ACK information bit. According to 3GPP standard TS 38.213, a HARQ-ACK information bit value of 0 represents a negative acknowledgement (NACK) while a HARQ-ACK information bit value of 1 represents a positive acknowledgement (ACK). According to the UE procedure for reporting control information in TS 38.213, for a semi persistent scheduling (SPS) physical downlink shared channel (PDSCH) reception ending at slot n, the UE transmits a physical uplink control channel (PUCCH) carrying hybrid automatic repeat request (HARQ) acknowledgement (ACK) or non-acknowledgement (NACK) in slot n+K1. HARQ ACK or NACK is referred to as HARQ-ACK. SPS HARQ-ACK refers to HARQ-ACK for SPS traffic, such as SPS PDSCH. The timing indicator indicating the feedback timing offset K1 is provided by a PDSCH-to-HARQ_feedback timing indicator field in downlink control information (DCI) activating the SPS PDSCH reception or provided by a parameter dl-DataToUL-ACK. The timing indicator indicates one K1 value selected from K1 values in a configured K1 set. The DCI activating the SPS PDSCH reception may be referred to as activation DCI. However, if slot n+K1 is not an uplink (UL) slot, i.e., HARQ-ACK timing in the activation DCI collides with non-UL symbols given by semi-static time-division duplex (TDD) configuration, the UE will drop the PUCCH transmission carrying the HARQ-ACK.

For example, in downlink (DL) heavy TDD configurations, when SPS periodicity is one slot, one fixed HARQ-ACK timing value K1 is not feasible to determine proper UL slots for every transmission of HARQ-ACKs for DL SPS PDSCH slots. Additionally, dropping HARQ-ACK can increase decoding workload at the UE and consume pre-configured PDSCH resource. Moreover, dropping HARQ-ACK and retransmitting the SPS PDSCH can cause system performance degradation in terms of latency and resource efficiency due to the necessity.

For current 3GPP standard, enhancement is needed if one or more PUCCH resources for HARQ-ACK responding SPS PDSCH without associated DCI collide with at least one of the following:

DL symbols given by a semi-static TDD configuration; and

Flexible symbols given by semi-static TDD configuration under some conditions, including:

a case where the UE is not configured to monitor slot format indicator (SFI);

a case where the UE is configured to monitor SFI, but no slot format is indicated for the slot carrying the PUCCH; or a case where the UE is configured to monitor SFI and if a slot format indicates a set of symbols of the PUCCH as DL/flexible.

In Rel-16 URLLC, a UE may be configured with multiple downlink SPS configurations for a serving cell, where up to 8 SPS configurations can be configured for a serving cell simultaneously. Multiple active downlink SPS configurations are beneficial to reduce latency for sporadic traffic, and useful for periodic traffic whose arrival periodicity is not exactly configurable using the unit of symbols in NR. In these use cases, SPS PDSCH resources are overprovisioned, where a lot of SPS PDSCH occasions have no downlink data to be transmitted. For example, for TSN traffic transmission, an arrival of 120 Hz, i.e., the periodicity is 8.333 ms or 8.333 slots for 15 kHz subcarrier spacing, is not a supportive or configurable value of periodicity for SPS PDSCH. As a result, two or more SPS configurations with different periodicities or SPS locations are necessary to be jointly activated to serve this TSN traffic. Actually, only a small amount of SPS PDSCH occasions of each SPS configuration will carry data.

According to current 3GPP standards, a UE shall report HARQ-ACK feedback for each configured SPS PDSCH occasion, even if no actual downlink transmission is performed in an SPS PDSCH occasion. Thus, the UE will report NACK for each of non-transmitted SPS PDSCHs to a gNB. Feedback of these NACK bits is not necessary and can cause UE power consumption, induce uplink interference to other cells, and degrade PUCCH transmission reliability due to higher coding rate under limited PUCCH resources. Hence, an enhanced HARQ processing method is desired.

SUMMARY OF THE INVENTION

An object of the present disclosure is to propose a HARQ processing method, a user equipment, and a base station.

In a first aspect, an embodiment of the invention provides a HARQ processing method executable in a user equipment (UE), comprising:
  monitoring a plurality of periodic SPS PDSCH resources configured through an RRC signaling;
  determining to select one or more SPS PDSCHs on the plurality of periodic SPS PDSCH resources; decoding the selected one or more SPS PDSCHs; and
  performing HARQ-ACK feedback for the selected one or more SPS PDSCHs in response to the decoding by constructing a HARQ-ACK codebook to include one or more HARQ-ACK bits for the selected one or more SPS PDSCHs.

In a second aspect, an embodiment of the invention provides a user equipment (UE) comprising a processor configured to call and run a computer program stored in a memory, to cause a device in which the chip is installed to execute the disclosed method and any combination of embodiments of the disclosed method.

In a third aspect, an embodiment of the invention provides a HARQ processing method executable in a base station, comprising:
  allocating a plurality of periodic SPS PDSCH resources configured through an RRC signaling;
  receiving HARQ-ACK feedback for selected one or more SPS PDSCHs on the plurality of periodic SPS PDSCH resources by receiving a HARQ-ACK codebook that includes one or more HARQ-ACK bits for the selected one or more SPS PDSCHs.

In a fourth aspect, an embodiment of the invention provides a base station comprising a processor configured to call and run a computer program stored in a memory, to cause a device in which the chip is installed to execute the disclosed method and any combination of embodiments of the disclosed method.

The disclosed method may be programmed as computer executable instructions stored in non-transitory computer readable medium. The non-transitory computer readable medium, when loaded to a computer, directs a processor of the computer to execute the disclosed method.

The non-transitory computer readable medium may comprise at least one from a group consisting of: a hard disk, a CD-ROM, an optical storage device, a magnetic storage device, a Read Only Memory, a Programmable Read Only Memory, an Erasable Programmable Read Only Memory, EPROM, an Electrically Erasable Programmable Read Only Memory and a Flash memory.

The disclosed method may be programmed as a computer program product, that causes a computer to execute the disclosed method.

The disclosed method may be programmed as a computer program, that causes a computer to execute the disclosed method.

Embodiments of the disclosure may be applied to HARQ-ACK feedback for URLLC/IIoT to reduce SPS PDSCH feedback latency and enhance HARQ-ACK transmission reliability. An embodiment of the invention provides a HARQ processing method to instruct a UE to postpone HARQ-ACK transmissions to PUCCH resources without collision with non-uplink symbols in an explicit or implicit way. The disclosed method prevents SPS HARQ-ACK dropping in TDD configurations when HARQ-ACK feedback timing collides with non-UL symbols. An embodiment of the disclosed method reduces HARQ-ACK bits for SPS PDSCH occasions without actual downlink transmission in the use case of multiple SPS configurations.

An embodiment of the invention provides a HARQ processing method to indicate to a UE un-transmitted SPS PDSCHs so that the UE can skip corresponding HARQ-ACK feedback for the SPS PDSCHs. Useful effects of one or more embodiments of the disclosure may comprise:
  reducing transmission latency of HARQ-ACK feedback in DL SPS for TDD scenario;
  avoiding interference to other cells by unnecessary HARQ-ACK transmissions;
  saving UE power consumption;
  enhancing efficiency of PUCCH resource utilization for carrying HARQ-ACK bits; and/or
  enhancing HARQ-ACK feedback reliability with a lower coding rate.

BRIEF DESCRIPTION OF THE SEVERAL VIEWS OF THE DRAWINGS

In order to more clearly illustrate the embodiments of the present disclosure or related art, the following figures will be described in the embodiments are briefly introduced. It is obvious that the drawings are merely some embodiments of the present disclosure, a person having ordinary skill in this field may obtain other figures according to these figures without paying the premise.

DETAILED DESCRIPTION OF SPECIFIC EMBODIMENTS OF THE INVENTION

Embodiments of the disclosure are described in detail with the technical matters, structural features, achieved objects, and effects with reference to the accompanying drawings as follows. Specifically, the terminologies in the embodiments of the present disclosure are merely for describing the purpose of the certain embodiment, but not to limit the disclosure.

Figure 1:
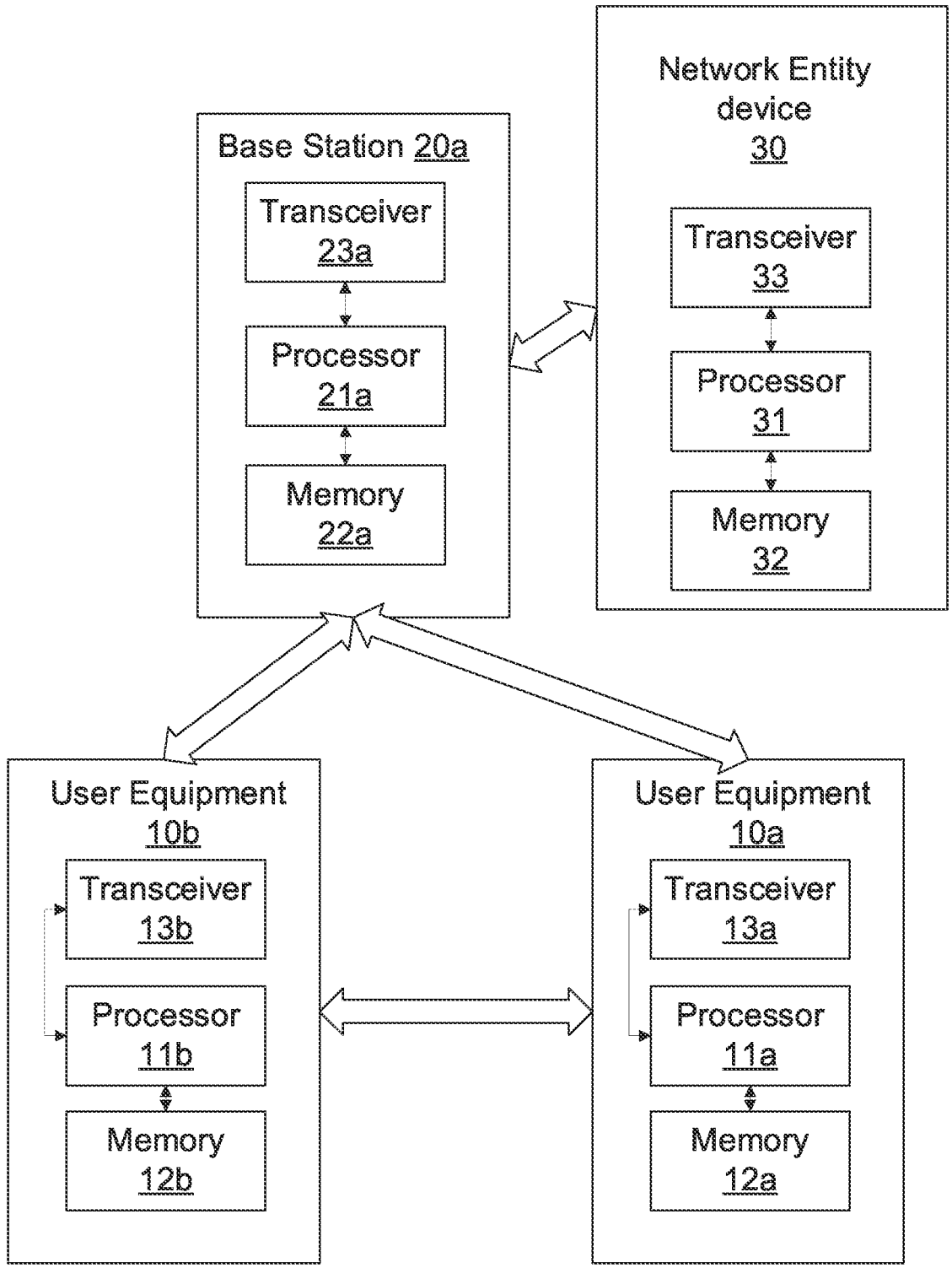
FIG. 1 illustrates a schematic view of a telecommunication system.

With reference to FIG. 1, a telecommunication system including a UE 10*a*, a UE 10*b*, a base station (BS) 20*a*, and a network entity device 30 executes the disclosed method according to an embodiment of the present disclosure. FIG. 1 is shown for illustrative not limiting, and the system may comprise more UEs, BSs, and CN entities. Connections between devices and device components are shown as lines and arrows in the FIGs. The UE 10*a* may include a processor 11*a*, a memory 12*a*, and a transceiver 13*a*. The UE 10*b* may include a processor 11*b*, a memory 12*b*, and a transceiver 13*b*. The base station 20*a* may include a processor 21*a*, a memory 22*a*, and a transceiver 23*a*. The network entity device 30 may include a processor 31, a memory 32, and a transceiver 33. Each of the processors 11*a*, 11*b*, 21*a*, and 31 may be configured to implement proposed functions, procedures and/or methods described in the description. Layers of radio interface protocol may be implemented in the processors 11*a*, 11*b*, 21*a*, and 31. Each of the memory 12*a*, 12*b*, 22*a*, and 32 operatively stores a variety of programs and information to operate a connected processor. Each of the transceivers 13*a*, 13*b*, 23*a*, and 33 is operatively coupled with a connected processor, transmits and/or receives radio signals or wireline signals. The UE 10*a* may be in communication with the UE 10*b* through a sidelink. The base station 20*a* may be an eNB, a gNB, or one of other types of radio nodes, and may configure radio resources for the UE 10*a* and UE 10*b*.

Each of the processors 11*a*, 11*b*, 21*a*, and 31 may include an application-specific integrated circuit (ASICs), other chipsets, logic circuits and/or data processing devices. Each of the memory 12*a*, 12*b*, 22*a*, and 32 may include read-only memory (ROM), a random access memory (RAM), a flash memory, a memory card, a storage medium and/or other storage devices. Each of the transceivers 13*a*, 13*b*, 23*a*, and 33 may include baseband circuitry and radio frequency (RF) circuitry to process radio frequency signals. When the embodiments are implemented in software, the techniques described herein may be implemented with modules, procedures, functions, entities, and so on, that perform the functions described herein. The modules may be stored in a memory and executed by the processors. The memory may be implemented within a processor or external to the processor, in which those may be communicatively coupled to the processor via various means are known in the art.

The network entity device 30 may be a node in a CN. CN may include LTE CN or 5G core (5GC) which includes user plane function (UPF), session management function (SMF), mobility management function (AMF), unified data management (UDM), policy control function (PCF), control plane (CP)/user plane (UP) separation (CUPS), authentication server (AUSF), network slice selection function (NSSF), and the network exposure function (NEF).

An example of the UE in the description may include one of the UE 10*a* or UE 10*b*. An example of the base station in the description may include the base station 20*a*. Uplink (UL) transmission of a control signal or data may be a transmission operation from a UE to a base station. Downlink (DL) transmission of a control signal or data may be a transmission operation from a base station to a UE. A DL control signal may comprise downlink control information (DCI) or a radio resource control (RRC) signal, from a base station to a UE.

The communication between UEs may be realized according to device to device (D2D) communication or vehicle-to-everything (V2X) communication. V2X communication includes vehicle-to-vehicle (V2V), vehicle-to-pedestrian (V2P), and vehicle-to-infrastructure/network (V2I/N) according to a sidelink technology developed under 3rd generation partnership project (3GPP) release 14, 15, 16, and beyond. UEs communicate with each other directly via a sidelink interface such as a PC5 interface. The disclosed method may be applied to a D2D or V2X communication. For sidelink based SPS traffic transmission on the Physical Sidelink Shared Channel (PSSCH), a transmitting side UE that sends SPS traffic scheduled by a gNB to a receiving side UE may operate similar operations as the gNB (e.g., gNB 20 in FIG. 2) in the description. The receiving side UE that receives the SPS traffic from the transmitting side UE may operate similar operations as the UE (e.g., UE 10 in FIG. 2) in the description. The receiving side UE performs HARQ feedback in response to sidelink SPS PSSCH transmission in Physical Sidelink Feedback Channel (PSFCH) based on the methods described in one or more embodiments.

Figure 2:
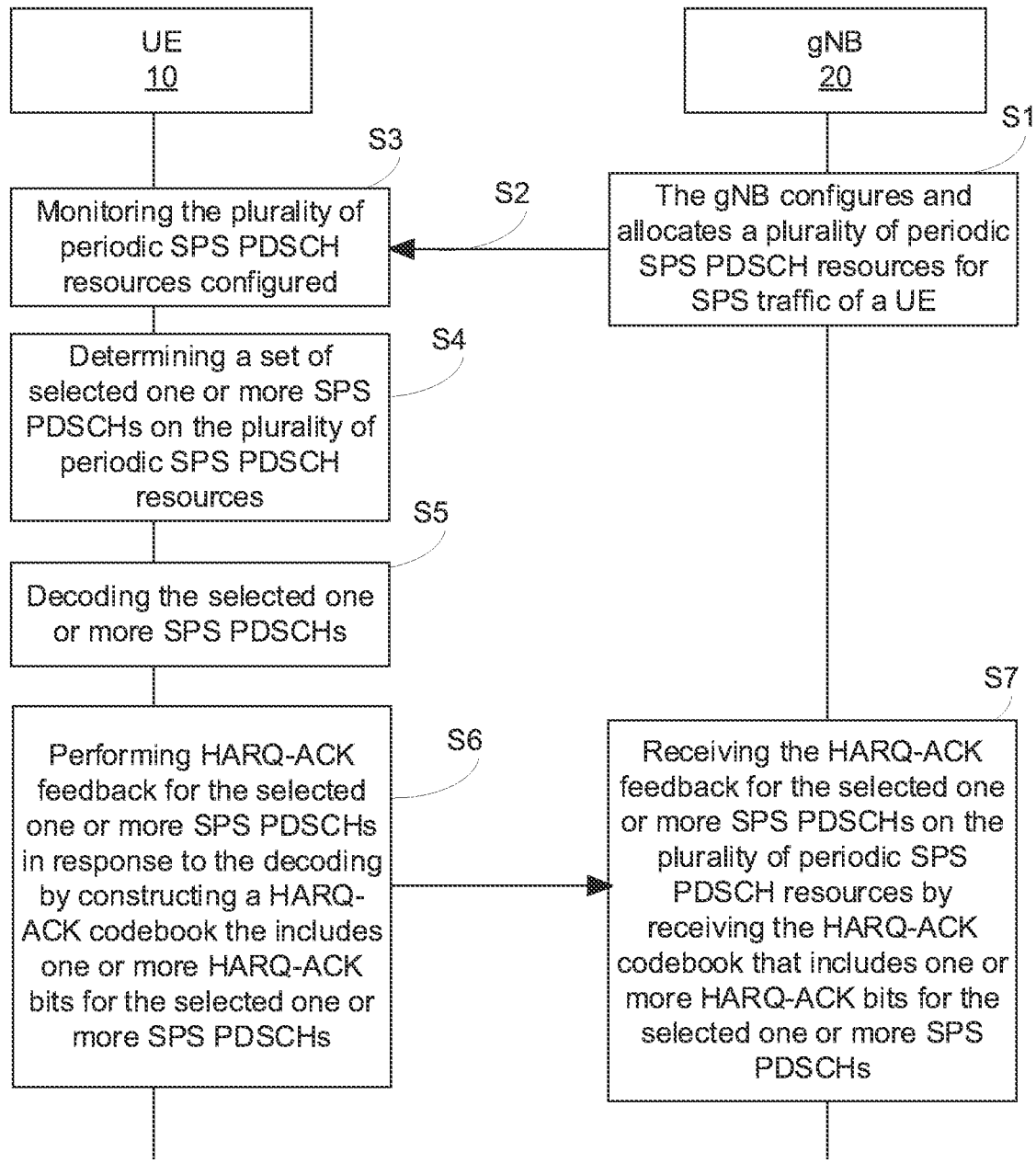
FIG. 2 illustrates a schematic view showing a HARQ processing method according to an embodiment of the invention.

With reference to FIG. 2, a gNB 20 executes a HARQ processing method. The gNB 20 may comprise an embodiment of the base station 20*a*. Note that although the gNB 20 is described as an example in the description, the HARQ processing method may be executed by a base station, such as an eNB, a base station integrating an eNB and a gNB, or a base station for beyond 5G technologies. A UE 10 executes a HARQ processing method. The UE 10 may comprise an embodiment of the UE 10*a* or UE 10*b*.

The gNB 20 configures and allocates a plurality of periodic SPS PDSCH resources for an SPS traffic of the UE 10 (S1) by sending an RRC signal that configures the plurality of periodic SPS PDSCH resources to the UE 10 (S2).

The UE 10 receives the RRC signal and determines configuration of a plurality of periodic SPS PDSCH resources in the RRC signal. The UE 10 monitors the plurality of periodic SPS PDSCH resources configured through the RRC signaling according to the configuration (S3).

The UE 10 determines a set of selected one or more SPS PDSCHs on the plurality of periodic SPS PDSCH resources (S4) and decodes the selected one or more SPS PDSCHs (S5). In a configuration where SPS PDSCHs are transmitted on every resource of the plurality of periodic SPS PDSCH resources, and the UE 10 determines to select all the SPS PDSCHs on the plurality of periodic SPS PDSCH resources as the selected one or more SPS PDSCHs. In an embodiment, the selected one or more SPS PDSCHs may be selected by the UE determines from one or more actually transmitted SPS PDSCHs. In an embodiment, the one or more SPS PDSCHs are one or more SPS PDSCHs which are actually transmitted on the plurality of periodic SPS PDSCH resources, and the UE 10 determines the one or more actually transmitted SPS PDSCHs based on detection of a DM-RS sequence within each SPS PDSCH resource of the plurality of periodic SPS PDSCH resources. In an embodiment, the UE 10 determines to select the one or more SPS PDSCHs which are actually transmitted on the plurality of periodic SPS PDSCH resources based on an SPS PDSCH location indication in an RRC configuration or DCI indication.

The UE 10 performs HARQ-ACK feedback for the selected one or more SPS PDSCHs in response to the decoding by constructing a HARQ-ACK codebook to include one or more HARQ-ACK bits for the selected one or more SPS PDSCHs (S6). In an embodiment, the UE 10 determines to select the one or more SPS PDSCHs which are actually transmitted on the plurality of periodic SPS PDSCH resources based on an SPS PDSCH location indication in an RRC configuration or DCI indication. In an embodiment, the UE 10 reduces one or more HARQ-ACK bits to be added to the HARQ-ACK codebook according to a feedback reduction condition. The feedback reduction condition may be indicated in DCI or RRC signaling. In an embodiment, the UE 10 determines to skip transmission of the constructed HARQ-ACK codebook according to a feedback skipping condition and transmits a non-skipped HARQ-ACK codebook on uplink resources. The feedback skipping condition may be indicated in DCI or RRC signaling.

The gNB 20 receives the HARQ-ACK feedback for the selected one or more SPS PDSCHs on the plurality of periodic SPS PDSCH resources by receiving the HARQ-ACK codebook that includes one or more HARQ-ACK bits for the selected one or more SPS PDSCHs (S7).

Embodiment 1: Solutions of HARQ-ACK Dropping Due to Unavailable UL Symbols in TDD Configuration With reference to FIG. 3, the gNB 20 executes an embodiment of the disclosed method. The gNB 20 transmits to the UE 10 an SPS PDSCH 200 at DL slot or sub-slot location n associated with a HARQ feedback timing indicator indicating the feedback timing offset K1 for the SPS PDSCH 200 (S11). The UE 10 receives the SPS PDSCH 200 at the DL slot or sub-slot location n associated with the HARQ feedback timing indicator indicating the feedback timing offset K1 for the SPS PDSCH (S12). The n is a variable representing the DL slot or sub-slot location n that is used by the UE 10 and the gNB 20 as a reference point for the feedback timing offset K1. Knowledge of an initial slot or sub-slot n+K1 and a target slot or sub-slot n+K1_adj may be obtained or synchronized by the UE 10 and the gNB 20 via an explicit control signaling, such as RRC signaling or DCI, or via an implicit scheme, such as K1 value indexing and mapping. An adjusted HARQ-ACK feedback timing K1_adj=n+K1+K1_offset. K1_offset is an offset for K1. The offset K1_offset is used to relocate an adjusted HARQ feedback timing to the target slot or sub-slot n+K1_adj when a symbol for HARQ feedback in the initial slot or sub-slot n+K1 is invalid. In an embodiment, the slot or sub-slot location n is an ending slot or sub-slot n of the SPS PDSCH 200 received by the UE 10. In another embodiment, the slot or sub-slot location n may be an ending slot or sub-slot n of DCI received by the UE 10. K1 may be interpreted as the feedback timing offset between the DL slot where a PDSCH transmission is scheduled on PDSCH and the UL slot where the HARQ-ACK for the scheduled PDSCH transmission needs to be sent.

The UE 10 determines a HARQ-ACK feedback timing used for a HARQ-ACK bit responding to the SPS PDSCH 200 (S13). The gNB 20 determines the HARQ-ACK feedback timing used for the HARQ-ACK bit responding to the transmitted SPS PDSCH 200 (S14) and determines whether to retransmit the SPS PDSCH 200 to the UE 10 in response to the HARQ-ACK bit at the HARQ-ACK feedback timing.

In S13, when a symbol within a slot or sub-slot location n+K1 as a HARQ-ACK feedback timing used for a HARQ-ACK bit responding to the received SPS PDSCH is invalid, the UE 10 adjusts the HARQ-ACK feedback timing to an adjusted slot or sub-slot location n+K1_adj with respect to the received SPS PDSCH, wherein the adjusted slot or sub-slot location n+K1_adj is obtained from the slot or sub-slot location n and an adjusted HARQ-ACK feedback timing K1_adj. When the symbol within a slot or sub-slot location n+K1 as the HARQ-ACK feedback timing used for HARQ-ACK bit responding to the SPS PDSCH 200 is valid, the UE 10 does not adjust the HARQ-ACK feedback timing.

In S14, when a symbol within a slot or sub-slot location n+K1 as the HARQ-ACK feedback timing used for a HARQ-ACK bit responding to the transmitted SPS PDSCH 200 is invalid, the gNB 20 adjusts the HARQ-ACK feedback timing to an adjusted slot or sub-slot location n+K1_adj with respect to the transmitted SPS PDSCH 200, wherein the adjusted slot or sub-slot location n+K1_adj is obtained from the slot or sub-slot location n and an adjusted HARQ-ACK feedback timing K1_adj. When the symbol within a slot or sub-slot location n+K1 as the HARQ-ACK feedback timing used for HARQ-ACK bit responding to the transmitted SPS PDSCH 200 is valid, the gNB 20 does not adjust the HARQ-ACK feedback timing.

The UE 10 generates a HARQ-ACK codebook (S15). The HARQ-ACK codebook comprises one or more HARQ-ACK bits including the HARQ-ACK bit responding to the received SPS PDSCH, each of the one or more HARQ-ACK bits corresponds to one of a plurality of received SPS PDSCHs. The UE 10 transmits the HARQ-ACK codebook to the gNB 20 (S16). The gNB 20 receives the HARQ-ACK codebook from the UE 10 (S17).

In S16, when the symbol within a slot or sub-slot location n+K1 is invalid, the UE 10 transmits the HARQ-ACK codebook in the adjusted slot or sub-slot location n+K1_adj on one or more symbols of radio resources (e.g., uplink resources) in response to the plurality of received SPS PDSCHs.

In S17, when the symbol within a slot or sub-slot location n+K1 is invalid, the gNB 20 receives the HARQ-ACK codebook in the adjusted slot or sub-slot location n+K1_adj on the one or more symbols of radio resources (e.g., uplink resources) in response to the plurality of transmitted SPS PDSCHs. The HARQ-ACK codebook comprises one or more HARQ-ACK bits including the HARQ-ACK bit responding to the transmitted SPS PDSCH, each of the one or more HARQ-ACK bits corresponds to one of a plurality of transmitted SPS PDSCHs. A location of the one or more symbols used for the HARQ-ACK bit responding to the received SPS PDSCH may be configured by RRC signaling.

Embodiment 1-1: UE Autonomously Postpones HARQ-ACK Transmission to One of Available Uplink Resources after Collision Happens HARQ-ACK may comprise a HARQ-ACK information bit or, for abbreviation, a HARQ-ACK bit. The UE 10 may use an adjusted value of K1 as a new K1 value for postponing HARQ-ACK transmission for each of the affected SPS PDSCHs. The new K1 value may be determined by UE 10 based on following candidate schemes:

In an embodiment, the new K1 value which match to one of K1 candidate values in the K1 set is determined according to a location of an available PUCCH resource. For example, the new K1 value is the smallest K1 value in the K1 set.

If a calculated new K1 value for a HARQ-ACK corresponds to a location of an available PUCCH resource but is larger than the maximum value of K1 in the K1 set, the UE 10 drops the HARQ-ACK.

Note that K1 values in the K1 set can be reconfigured by the gNB 20 according to a UL/DL traffic ratio signaled via semi-static or dynamic TDD configuration.

In an embodiment, the new K1 value is determined according to a location of an earliest available PUCCH resource. However, the new K1 value is not restricted to be one of K1 candidates in the K1 set as long as the new K1 value is smaller than a maximum allowable K1 value. The maximum allowable K1 value can be determined by following schemes.

Scheme 1: In an embodiment, the maximum allowable K1 value is the maximum K1 value in the original K1 set. If the calculated K1 value for a HARQ-ACK corresponds to the location of the earliest available PUCCH resource but is larger than the maximum value of K1 in the K1 set, the UE 10 drops the HARQ-ACK.

Scheme 2: In an embodiment, the gNB 20 can limits the maximum allowable K1 value by configuring a K1 threshold for the postponed HARQ-ACK transmission. Thus, the UE 10 can determine whether the HARQ-ACK is to be dropped or postponed based on this K1 threshold. The K1 threshold can be determined by the gNB 20 using RRC signaling according to one or more of the following:

a latency requirement of a traffic type of the SPS PDSCH;
Periodicity of UL/DL TDD configuration;
a range of K1 values in the original K1 set;
load balance of available PUCCH resources.

Figure 3:
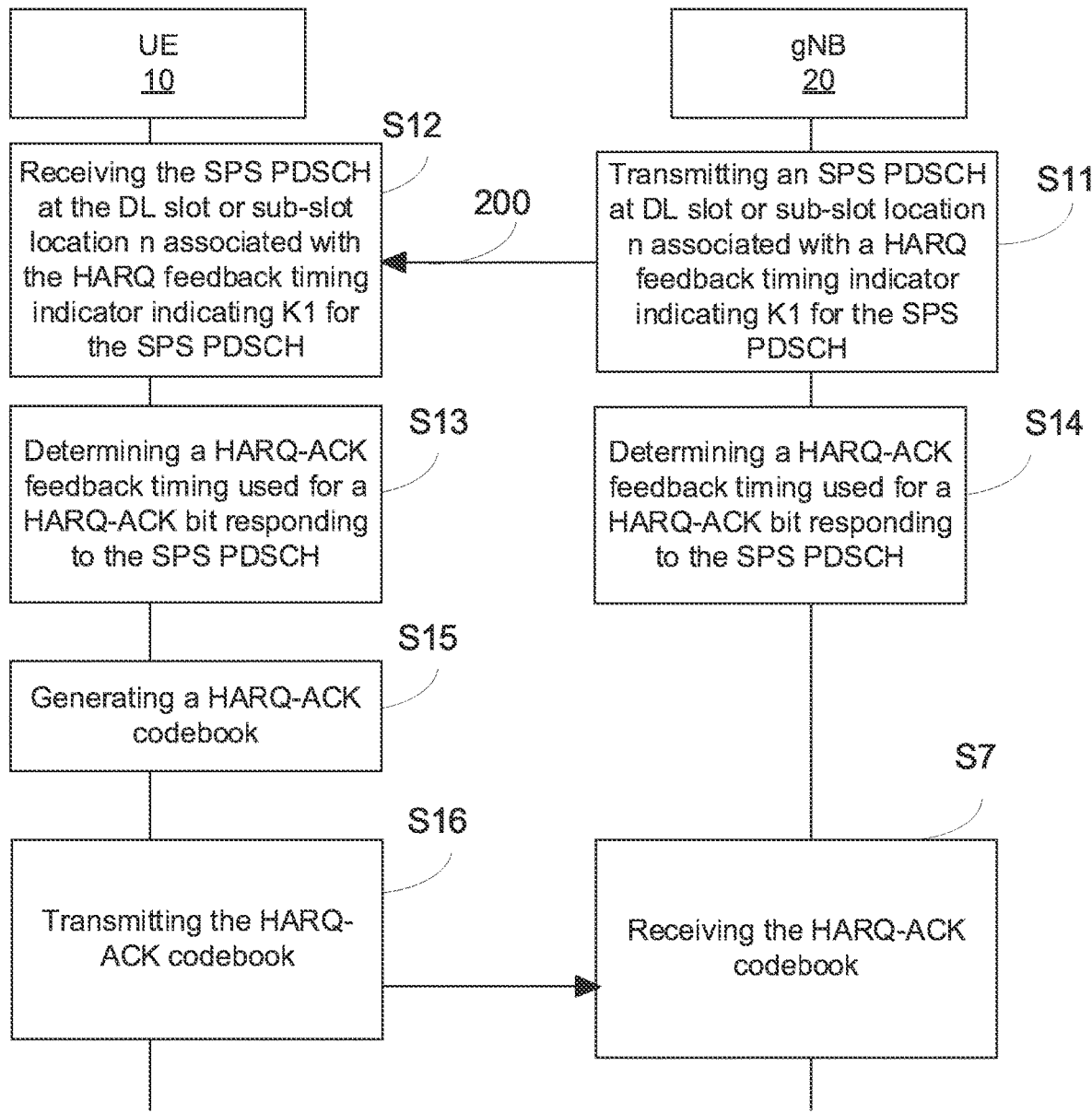
FIG. 3 illustrates a schematic view showing a HARQ processing method according to another embodiment of the invention.

In S13 and S14 in FIG. 3, the adjusted HARQ-ACK feedback timing K1_adj comprises an offset K1_offset value with respect to K1, and the adjusted slot or sub-slot location n+K1_adj is a slot or sub-slot location n+K1+K1_offset, which is determined by the UE 10 as an earliest available slot or sub-slot within which symbols in the PUCCH resource used for SPS HARQ-ACK feedback are valid.

At least one of the K1+K1_offset or K1_offset is limited by a maximum offset value, and the maximum offset value is configured via RRC configuration. The maximum offset value may be determined based on latency requirements of a corresponding traffic type of the received SPS PDSCH, a TDD DL/UL configuration format, a maximum K1 value across all configured K1 sets, or load balance of PUCCH resources.

Figure 4:
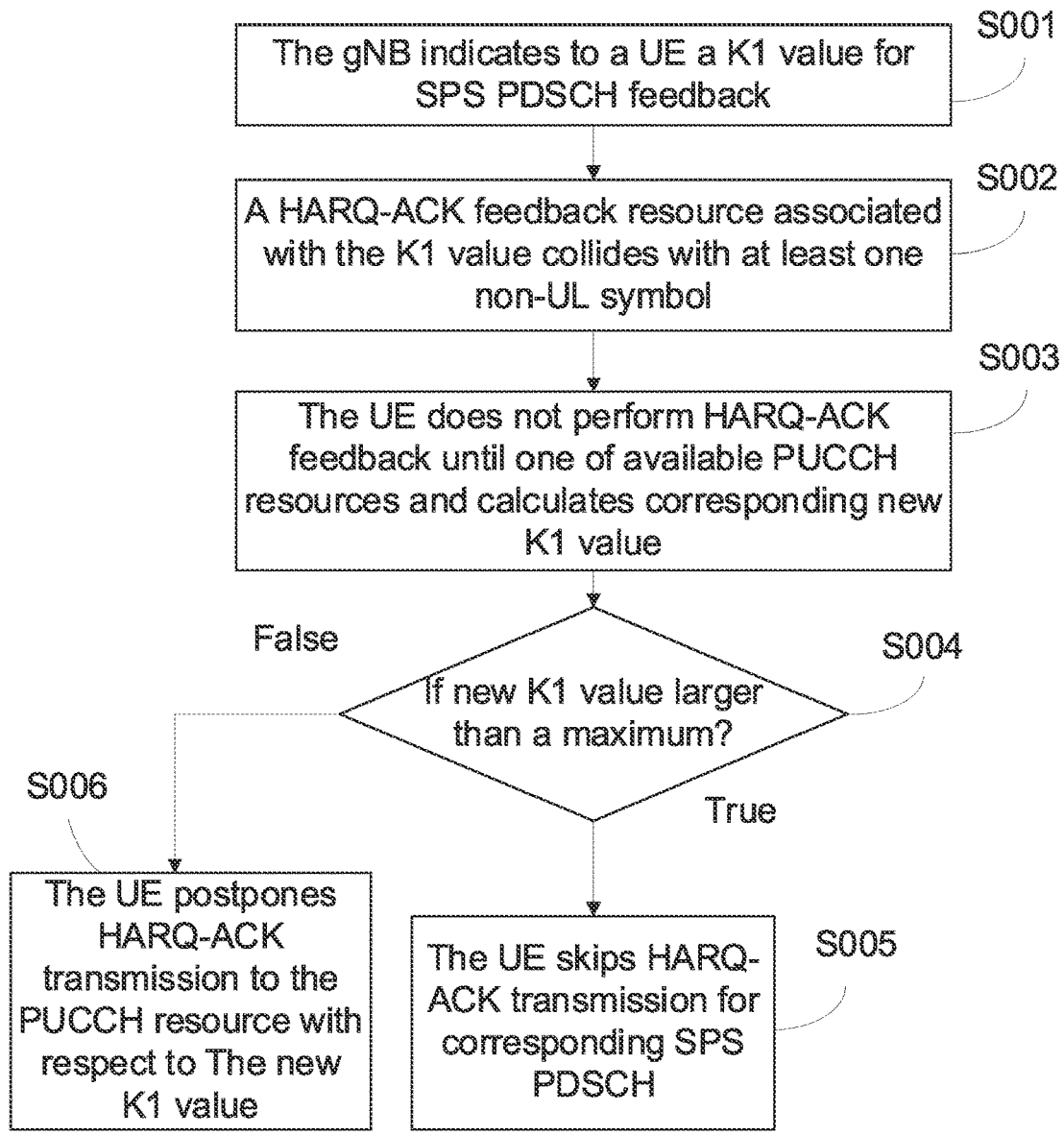
FIG. 4 illustrates a schematic view showing a procedure of UE autonomously postponing HARQ-ACK transmission.

Embodiment 1-1-1: An Example of a Procedure of UE Autonomously Postponing HARQ-ACK Transmission With reference to FIG. 4, the gNB 20 configures a K1 set for the UE 10 and indicates to the UE 10 a K1 value using a PDSCH-to-HARQ_feedback timing indicator field in activation DCI or dl-DataToUL-ACK in RRC configuration (S001).

The HARQ-ACK feedback resource for corresponding SPS PDSCH with respect to the indicated K1 value collides with at least one non-UL symbol in TDD configuration (S002).

UE 10 does not perform HARQ-ACK transmission for the corresponding SPS PDSCH until one PUCCH resource of available PUCCH resources arrives and calculates a new K1 value to match this PUCCH resource (S003).

UE 10 determines if the new K1 value is larger than the maximum allowable K1 value (S004).

If the new K1 value is larger than the maximum allowable K1 value, the UE 10 skip the HARQ-ACK transmission for the corresponding SPS PDSCH (S005).

If the new K1 value is not larger than the maximum allowable K1 value, the UE 10 postpones the HARQ-ACK transmission of SPS PDSCH to the PUCCH resource with respect to the new K1 value (S006).

Embodiment 1-2: To Determine a Location of Postponed HARQ-ACK Transmission Based on an Originally Assigned K1 Value, Periodicity of UL/DL TDD Configuration, and Latency Requirement of an SPS Traffic An originally assigned K1 value only applies to DL slots carrying an SPS PDSCH for which HARQ-ACK does not collide with any non-UL symbol. An SPS PDSCH for which HARQ-ACK collides with at least one non-UL symbol may be referred to as a collision-affected SPS PDSCH. Feedback occasions of other collision-affected SPS PDSCHs are distributed to available uplink slots based on a pre-determined rule as a function of one or more of the following parameters:

a ratio of DL and UL slots (or symbols) in a TDD time window;
a number of DL and UL slots (or symbols) in a TDD time window;
a location of DL and UL slots (or symbols) in a TDD time window;
a number of affected and/or non-affected DL slot (or symbols) in a TDD time window;
a number of available PUCCH resources for the SPS PDSCH in a TDD time window;
an originally assigned K1 value; and
a latency requirement of the SPS traffic.

Figure 5:
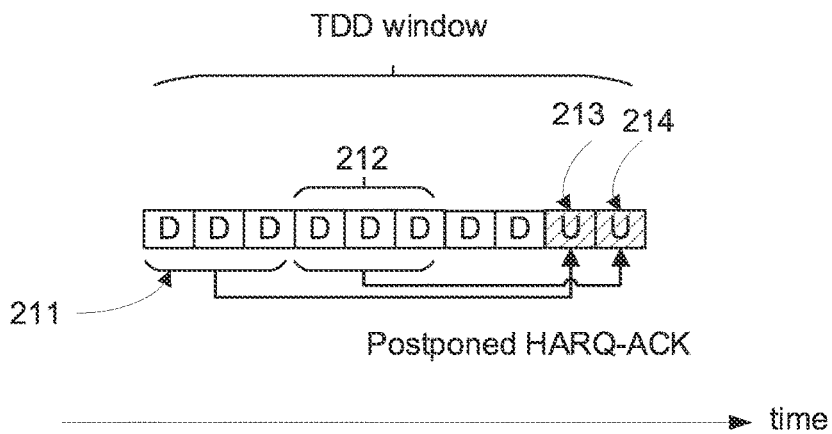
FIG. 5 illustrates a schematic view showing an example of HARQ-ACK mapping for a collision-affected SPS PDSCH.
Figure 7:
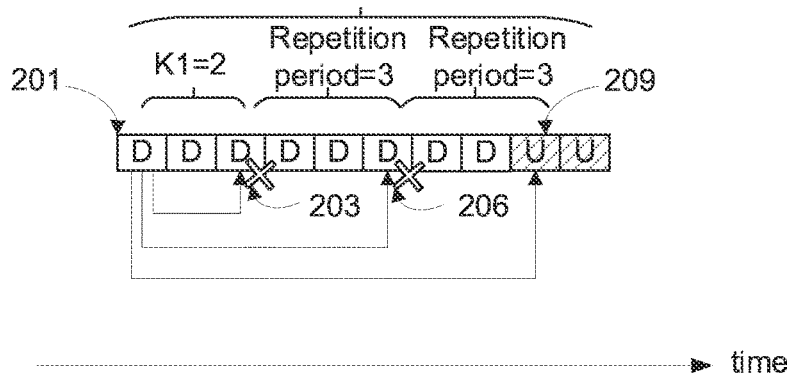
FIG. 7 illustrates a schematic view showing an example of HARQ-ACK repetition on PUCCH.
Figure 8:
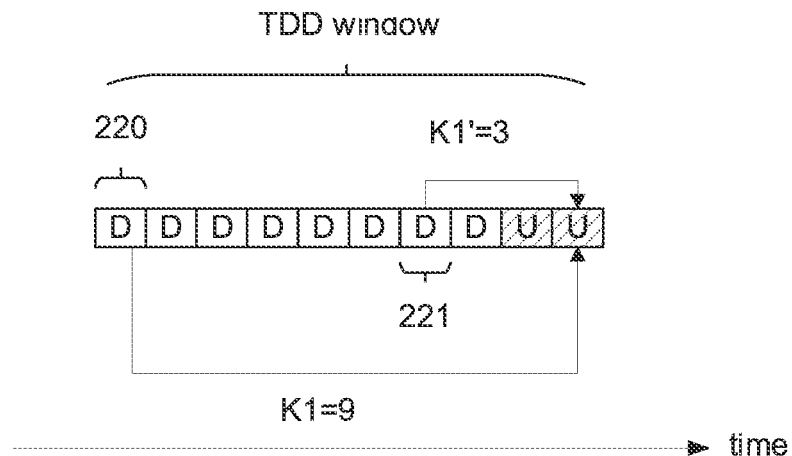
FIG. 8 illustrates a schematic view showing an example of K1 value extension for SPS PDSCH in the TDD configuration.

Embodiment 1-2-1: Examples of HARQ-ACK Mapping for a Collision-Affected SPS PDSCH FIG. 5 shows an example of HARQ-ACK mapping for a collision-affected SPS PDSCH. In the example, an assigned K1 value is 2, and periodicity of UL/DL TDD configuration is DDDDDDDDUU as shown in FIG. 5. In FIGS. 5, 7, and 8, D denotes a DL slot or sub-slot, and U denotes a UL slot or sub-slot.

Postponed HARQ-ACKs for SPS PDSCHs are as evenly distributed as possible among available PUCCH resources or UL slots. Two or more HARQ-ACK bits for received SPS PDSCHs at different slot or sub-slot locations, each with a corresponding HARQ feedback timing indicator, are transmitted in the same adjusted slot or sub-slot location n+K1_adj.

If the slot or sub-slot locations indicated by corresponding HARQ feedback timing indicators of two or more received SPS PDSCHs comprise invalid symbols for HARQ-ACK feedback transmission responding to the two or more received SPS PDSCHs, HARQ-ACK bits responding to the two or more received SPS PDSCHs are transmitted in the same adjusted slot or sub-slot location n+K1_adj. For example, as shown in FIG. 5, HARQ-ACK bits responding to received SPS PDSCHs 211 are transmitted in the same adjusted slot or sub-slot location 213. HARQ-ACK bits responding to received SPS PDSCHs 212 are transmitted in the same adjusted slot or sub-slot location 214.

Embodiment 1-3-1

When the UE 10 performs HARQ-ACK transmission based on a set of K1 values (i.e., a K1 set), one K1 value in the set maps to one of DL slots (or mini-slots) carrying SPS PDSCH in a TDD time window in a one-to-one mapping. A set of K1 values is referred to as a K1 set. The gNB 20 can pre-configure multiple sets of K1 values and indicates to the UE 10 one of multiple K1 sets for one K1 value to one DL slot (or mini-slot) mapping using the following possible scheme.

The gNB 20 configures a mapping table with multiple sets of K1 values. Each K1 set corresponds to a row index in the mapping table, and each of K1 values in a K1 set maps to the HARQ feedback timing of one of SPS PDSCHs in a TDD time window.

A set of K1 values may be selected based on a row index of the mapping table. The row index can be indicated semi-statically using RRC signaling or dynamically using a field, such as newly created field, an unused field for SPS, or the PDSCH-to-HARQ_feedback timing indicator field, in the DCI for SPS activation. In an embodiment, the adjusted slot or sub-slot location n+K1_adj for HARQ-ACK feedback transmission responding to the received SPS PDSCH is dynamically indicated in a DCI.

The mapping table may be created via RRC configuration. Each of the multiple K1 sets can be associated with one or more UL/DL TDD configurations.

Embodiment 1-3-1-1: Examples of a K1 Set Indication for One K1 Value to One DL Slot Mapping Table 1 shows examples of indexes for K1 set indication for one K1 value to one DL slot mapping. Assume periodicity of UL/DL TDD configuration is DDDDDDDDUU, and 8 DL slots within a TDD time window of 10 slots are available for SPS PDSCH transmission. The TDD time window periodically occurs in accordance with the periodicity of TDD configuration.

Possible indexing of K1 sets and K1 sets selection with reference to Table 1 are provided in the following. Each mapping of K1 value with respect to DL slot index in the table corresponds to the adjusted slot or sub-slot location n+K1_adj indicated dynamically by gNB.

K1 set index with a value of '00' restricts HARQ-ACKs to be transmitted at the first UL slot due to latency requirement.

K1 set index with a value of '01' restricts HARQ-ACKs to be transmitted at the last UL slot due to latency requirement as well as UE 10 feedback processing time limitation.

K1 set index with a value of '10' distributes HARQ-ACK evenly to 2 UL slots due to codebook size balancing.

K1 set index with a value of '11' postpones the feedback timing of the last 4 DL slots to the next TDD time window due to UE feedback processing time limitation. For example, in the entry with the index of '11', a number "10+4" of slots is the feedback timing offset K1 for the $5^{th}$ DL slot, a number "10+3" of slots is the feedback timing offset K1 for the $6^{th}$ DL slot, a number "10+2" of slots is the feedback timing offset K1 for the $7^{th}$ DL slot, and a number "10+1" of slots is the feedback timing offset K1 for the $8^{th}$ DL slot.

If some of K1 value to DL slot mapping is vacant in the table or shown as unavailable, the UE 10 may skip the HARQ-ACK transmission for the corresponding SPS PDSCH.

TABLE 1

| Index of | K1 value to of each DL slot mapping for the corresponding index of K1 set | | | | | | | |
|---|---|---|---|---|---|---|---|---|
| K1 set | DL slot 1 | DL slot 2 | DL slot 3 | DL slot 4 | DL slot 5 | DL slot 6 | DL slot 7 | DL slot 8 |
| 00 | 8 | 7 | 6 | 5 | 4 | 3 | 2 | 1 |
| 01 | 9 | 8 | 7 | 6 | 5 | 4 | 3 | 2 |
| 10 | 8 | 7 | 6 | 5 | 5 | 4 | 3 | 2 |
| 11 | 8 | 7 | 6 | 5 | 10 + 4 | 10 + 3 | 10 + 2 | 10 + 1 |

Embodiment 1-3-2

The gNB 20 may create multiple K1 candidates as a list, each of the K1 candidates can apply to one of SPS PDSCHs in a TDD time window. The UE 10 selects one K1 value among the K1 candidates for each of the SPS PDSCHs in a TDD time window. The K1 value for each of the SPS PDSCHs can be the same or different. Selecting one K1 value from the K1 candidates has the following options.

Option 1: For each of the SPS PDSCHs, the UE 10 autonomously selects one of feasible K1 values among the K1 candidates in the list based on a selection scheme and transmits HARQ-ACK over the UL slot with respect to the selected K1 value. For example, the UE 10 autonomously selects a K1 value associated with a first available PUCCH resource for HARQ-ACK transmission.

Option 2: The UE 10 selects one of the feasible K1 values in the K1 candidate list using a pre-determined rule as a function of one or more of the following parameters:
- a location of SPS PDSCH in the corresponding TDD time window;
- a number of feasible K1 values;
- a value range of feasible K1;
- a priority order of selecting K1 candidates by the UE 10 in the K1 candidate list after filtering out invalid K1 values due to availability of PUCCH resources;
- a latency restriction or a priority level of the corresponding SPS PDSCH; and
- a UE feedback processing time limitation.

Embodiment 1-3-2-1: Example of K1 Candidate Values Indication

For example, when a TDD configuration format is DDDDDDDDUU, and 8 DL slot within the TDD time window of 10 slots is available for SPS PDSCH transmission.

Table 2 is an example of indexing K1 candidate values. Note that Table 2 is not intended to limit the invention. The number of K1 candidates, the priority order of K1 candidates, or the value range of K1 candidates can be different in an alternative embodiment.

If the UE 10 cannot find any K1 candidates for HARQ-ACK transmission in available UL slots, the UE 10 may skip the HARQ-ACK transmission for the corresponding SPS PDSCH.

TABLE 2

| Index of K1 candidates | K1 candidate values with selection priority order applied to each of DL slot in the TDD time window |
|---|---|
| 00 | {8, 7, 6, 5, 4, 3, 2, 1} |
| 01 | {1, 2, 3, 4, 5, 6, 7, 8} |
| 10 | {4, 3, 2, 1} |
| 11 | {10 + 1, 10 + 2, 10 + 3, 10 + 4} |

Embodiment 1-3-3

The gNB 20 may create multiple candidates of K1 values as a group, of which each K1 value candidate can be applied to one of the SPS PDSCHs in a TDD time window. The candidates of K1 values are referred to as K1 candidates. Two or more K1 values can be selected from the K1 candidates by the UE 10 for duplicated HARQ-ACK transmissions to enhance reliability of HARQ-ACK feedback. The number of K1 values selected from the K1 candidates by the UE 10 for each of SPS PDSCHs can be configured by the gNB 20. Selection schemes for selecting the two or more feasible K1 values from the K1 candidates can comprise one of the following options:

Option 1: In an embodiment, for each of the collision-affected SPS PDSCHs, the UE 10 autonomously selects two or more feasible K1 values among the K1 candidates based on a selection scheme and transmits HARQ-ACK based on the selected two or more K1 values accordingly. For example, the UE 10 may select two or more feasible K1 values associated with all of available PUCCH resources for HARQ-ACK transmission.

Option 2: In an embodiment, the UE 10 selects two or more of the feasible K1 values in a list of the K1 candidates using a pre-determined rule as a function of one or more of following parameters:

A number of duplicated HARQ-ACK transmission configured by the gNB.

A location of a received SPS PDSCH in the corresponding TDD time window: For example, the UE 10 may select more than one feasible K1 values to be transmitted within the TDD time window if the location of the received SPS PDSCH is at the front of the TDD time window.

A number of feasible K1 values: For example, the number of K1 values selected by the UE 10 as feasible can be minimum between an upper limit value and the number of feasible K1 values, i.e., min {upper limit value, the number of feasible K1 values}, where the upper limit value can be configured by the gNB 20.

A value range of feasible K1 values: For example, the number of K1 values selected by the UE 10 among feasible K1 values is limited by a value range configured by the gNB 20.

A priority order for selecting a K1 value in a K1 candidate list after filtering out invalid K1 values due to availability of PUCCH resource: For example, the UE 10 can only select first few K1 values among feasible K1 values arranged according to a priority order in the K1 candidate list.

A latency restriction or priority level of corresponding SPS PDSCH.

A UE feedback processing time limitation.

Embodiment 1-4

AK1 value for calculating a location for reporting a HARQ-ACK, regardless of whether the HARQ-ACK is to be dropped or not, may be dynamically indicated to the UE 10 by the gNB 20 using activation DCI. The gNB 20 may indicate to the UE 10 in the DCI one or more selected SPS PDSCHs need to postpone their HARQ-ACK transmission before or after the HARQ-ACK transmission has been dropped. For example, indication of the one or more selected SPS PDSCHs for postponed HARQ-ACK transmission can be based on the slot or sub-slot location indication of the selected SPS PDSCH, the slot or sub-slot location indication of HARQ-ACK feedback of a corresponding selected SPS PDSCH, an index number of an SPS configuration and/or a HARQ Process ID. Before the gNB 20 can determine a proper uplink resource for HARQ-ACK transmission, a non-numerical value of K1 may be first applied to the UE 10 by the gNB 20 via RRC signaling or DCI, and then the UE 10 needs to wait for an actual numerical K1 value indicated via dynamic indication in DCI. In the adjusted slot or sub-slot location n+K1_adj, the PUCCH resource used for HARQ-ACK feedback transmission responding to the received SPS PDSCH is dynamically indicated in the DCI. The adjusted slot or sub-slot location n+K1_adj may be indicated using a slot indicator with an offset value relative to a slot or sub-slot carrying the DCI. Schemes for dynamic indication of one or more K1 values by the gNB 20 may comprise one of the following.

Scheme 1: In an embodiment, the gNB 20 uses the PDSCH-to-HARQ_feedback timing indicator field of activation DCI to indicate a non-numerical value of K1 to the UE. The non-numerical value of K1 means not yet determined value of K1 at the moment.

After indicating the non-numerical value of K1, the gNB 20 may dynamically indicate an actual numerical K1 value for an SPS PDSCH to the UE. For example, the indication of the actual numerical K1 value can be provided in another activation DCI, to trigger transmission of all or part of HARQ-ACKs on a specific PUCCH resource based on the numerical K1 value.

Scheme 2: In an embodiment, the gNB 20 uses the RRC parameter dl-DataToUL-ACK in PUCCH configuration PUCCH-Config to indicate a default K1 value. Additionally, the gNB 20 uses the PDSCH-to-HARQ_feedback timing indicator field of an activation DCI to indicate a non-numerical value of K1.

For those SPS PDSCHs of which HARQ-ACKs are not dropped, the UE 10 uses the default K1 value for HARQ-ACK transmission. For those SPS PDSCHs of which HARQ-ACKs are dropped, the gNB 20 may dynamically indicate an actual numerical K1 value for an SPS PDSCH to the UE. A default K1 value is for non-dropped HARQ-ACK, and a non-numerical value of K1 is for dropped HARQ-ACK. For example, the actual numerical K1 value may be indicated dynamically using, for example, activation DCI to trigger transmission of all or part of postponed HARQ-ACKs on a specific PUCCH resource using the numerical K1 value.

Scheme 3: In an embodiment, the UE 10 assumes the dropped HARQ-ACKs will use non-numerical K1 values. For those SPS PDSCHs of which HARQ-ACKs are not dropped, the UE 10 may use the legacy scheme of K1 value indication to determine the slot or sub-slot location for HARQ-ACK transmission. For those SPS PDSCHs of which HARQ-ACKs are dropped, the gNB 20 may dynamically indicate an actual numerical K1 value for an SPS PDSCH to the UE. For example, the actual numerical K1 value may be indicated dynamically in another activation DCI, to trigger transmission of all or part of postponed HARQ-ACKs on a specific PUCCH resource based on the numerical K1 value.

Embodiment 1-4-1

Figure 6:
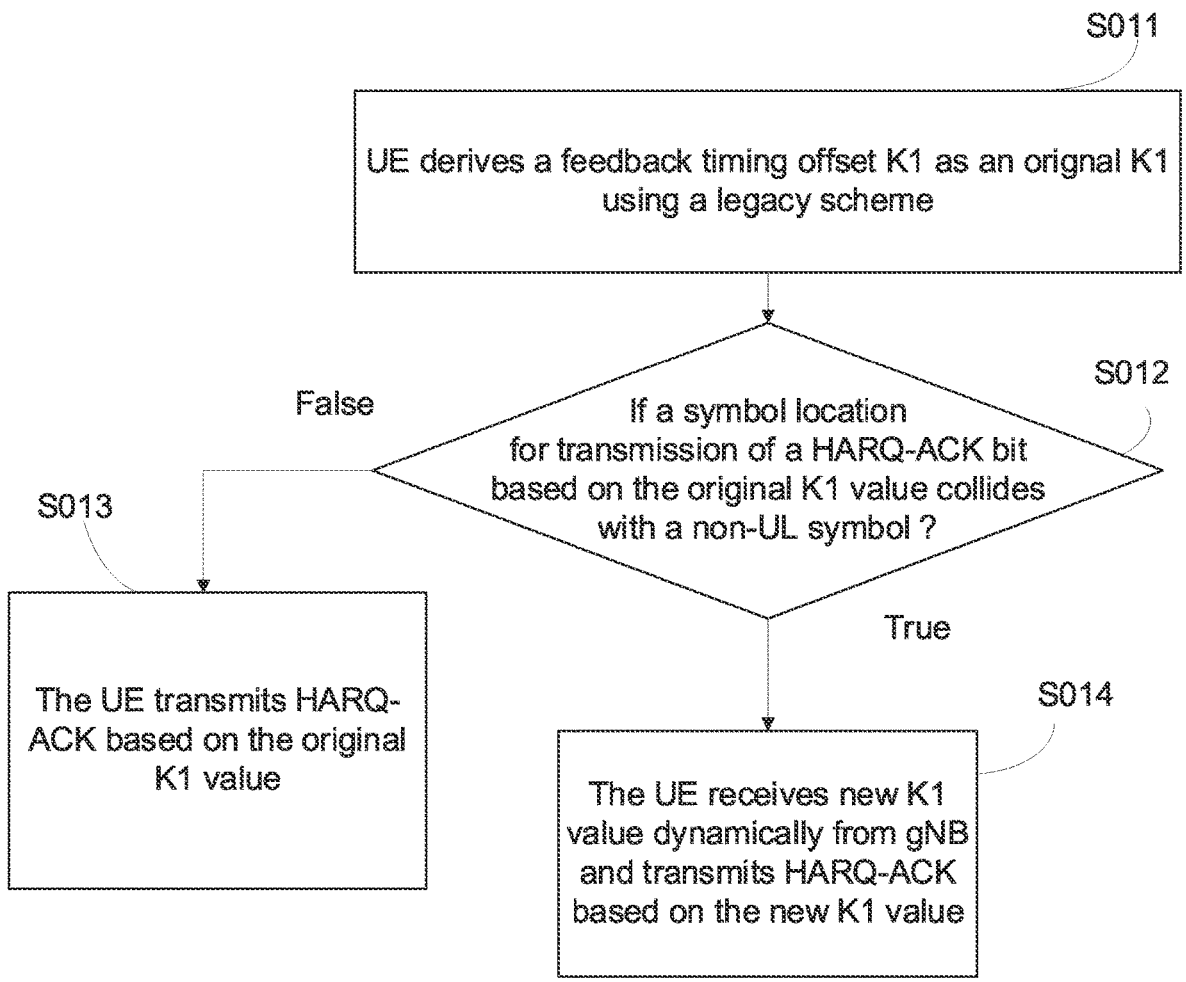
FIG. 6 illustrates a schematic view showing a procedure of dynamic K1 value indication.

FIG. 6 shows a procedure of dynamic K1 value indication by taking Scheme 3 as an example.

Step 1: The UE 10 derives HARQ-ACK feedback timing K1 for a processed SPS PDSCH using a legacy scheme as an originally assigned K1 value (S011).

Step 2: The UE 10 determines whether a location of HARQ-ACK transmission for the processed SPS PDSCH collides with at least one non-UL symbol based on the original assigned K1 value (S012).

Step 3: When the location of HARQ-ACK transmission for the processed SPS PDSCH does not collide with at least one non-UL symbol, the UE 10 uses the originally assigned K1 value for HARQ-ACK transmission (S013).

When the location of HARQ-ACK transmission for the processed SPS PDSCH collides with at least one non-UL symbol, the processed SPS PDSCH is a collision-affected SPS PDSCH, and the UE 10 receives a new K1 value from the gNB 20 dynamically via activation DCI and transmits the HARQ-ACK with respect to the new K1 value for collision-affected SPS PDSCH (S014).

Dynamic indication for retransmission of HARQ-ACK bits in the adjusted slot or sub-slot location n+K1_adj responding to the one or more received SPS PDSCHs may be determined by one or both of the gNB 20 and the UE 10 based on a location indication of one or more received SPS PDSCHs, a location indication of one or more dropped HARQ-ACK feedback, an indication of one or more SPS configuration IDs of the received SPS PDSCHs, an indication of one or more HARQ process IDs of the received SPS PDSCHs, or an indication of a priority level of received SPS PDSCHs.

Embodiment 1-5: Using HARQ-ACK Repetition on PUCCH to Alleviate HARQ-CK Dropping Effect in TDD In addition to using K1 value as a location indication of HARQ-ACK transmission for each of SPS PDSCHs with or without DCI, the gNB 20 may also set up other transmission occasions for HARQ-ACK to increase transmission opportunities and thus reduces the impact of HARQ-ACK dropping in TDD. A repetition number for a PUCCH transmission carrying the HARQ-ACK codebook is dynamically indicated in a DCI. Multiple transmission occasions for HARQ-ACK can be configured using repetition parameters via RRC configuration and/or activation DCI. The repetition parameters can include the following:
- a maximum repetition number; and/or
- a length of repetition period between two consecutive repetitions.

Occasions or conditions under which the UE 10 can terminate repetitive transmission can be configured by the gNB 20. Examples of the occasions or conditions may include:
- The UE 10 stops repetitions of HARQ-ACK transmission when the repetitions of HARQ-ACK transmission have reached the maximum repetition number.
- The UE 10 can skip remaining repetitions of HARQ-ACK as long as one of the PUCCH repetitions for HARQ-ACK feedback have been successfully transmitted in a slot or sub-slot with valid symbols.
- After the gNB 20 successfully received some of HARQ-ACKs from the UE, the gNB 20 can transmit a notification to UE 10 to indicate which part of HARQ-ACK transmissions have been received by the gNB 20 and request the UE 10 to terminate repetitions of HARQ-ACK.

Embodiment 1-5-1

FIG. 7 shows an example of HARQ-ACK repetition on PUCCH to alleviate HARQ-ACK dropping effect in TDD. In the example, an assigned K1 value is 2, repetition period is 3, and a TDD configuration format is DDDDDDDDUU. For the first DL slot 201 with SPS PDSCH in the TDD time window, the 3 repetitions can be distributed among 3 slot locations (i.e., slots 203, 206, and 209) with a K1 value 2. Therefore, the candidate locations for 3 repetitions are in the $3^{rd}$, $6^{th}$, and $9^{th}$ slots in the TDD time window. Since only the 3rd transmission opportunity is UL slot 209, HARQ-ACK can therefore be successfully transmitted in the 3rd repetition. In another embodiment, the repetitions can be transmitted in consecutive slots starting from the slot indicated by the K1 value. However, in this case, the repetition number may need to be large enough to reach one of the UL slots in the TDD time window.

For the first DL slot with SPS PDSCH in the TDD time window, the UE 10 can terminate HARQ-ACK repetitions subsequent to a successfully transmitted HARQ-ACK.

Embodiment 1-6

An embodiment of the disclosure provides K1 value extension for SPS PDSCH in the TDD configuration. For TDD configuration, if HARQ-ACK is postponed to a later available PUCCH resource, a K1 value for the postponed HARQ-ACK can be a large value, especially for sub-slot based HARQ-ACK feedback. An embodiment of the disclosure provides extension to a K1 value with limited bit size of the K1 value. Some examples of extending the K1 value may comprise the following schemes:

Scheme 1: A value range of K1 can be reduced by re-defining K1. For example, K1 may be redefined as a value that is counted from the last downlink slot (or sub-slot) of received SPS PDSCH in the TDD time window, such as the SPS PDSCH 221 in FIG. 8, or from a dedicated slot configured by gNB. The SPS PDSCH 221 may be an example of the SPS PDSCH 200.

Scheme 2: A K1 offset value K1_offset can be signaled by the gNB 20. The K1 offset value K1_offset can be added to the original K1 value to form an adjusted K1. The UE 10 derives an adjusted K1 value as K1+K1_offset. For example, the gNB 20 may indicate the K1 offset value K1_offset to the UE 10 in an RRC signal. Different K1 offset values can be configured by the gNB 20 based on a TDD configuration format.

In S13 and S14 of FIG. 3, the adjusted HARQ-ACK feedback timing K1_adj comprises an offset K1_offset value with respect to K1, and the adjusted slot or sub-slot location n+K1_adj is a slot or sub-slot location n+K1+K1_offset, which is determined by the UE 10 as an earliest available slot or sub-slot within which symbols in the PUCCH resource used for SPS HARQ-ACK feedback are valid.

Embodiment 1-6-1

FIG. 8 shows an example of K1 value extension for SPS PDSCH in the TDD configuration, taking Scheme 1 as an example. In the example, an originally assigned K1 value is 9, and a TDD configuration format is DDDDDDDDUU. For the first DL slot 220 of an SPS PDSCH in the TDD time window, a new reference point for the redefined K1 is the last DL slot 221 carrying an SPS PDSCH in the TDD time window, and the redefined K1 value (i.e., K1') equals to 3.

Embodiment 1-7

The above solutions and procedures in the aforementioned embodiments can also be applied to other use cases where HARQ-ACK is canceled. In S13 and S14 of FIG. 3, the symbol used for the HARQ-ACK bit responding to the received SPS PDSCH is determined as an invalid symbol if the symbol is not an uplink symbol. In addition to the use case where HARQ-ACK is dropped due to unavailable UL symbols in TDD configuration, the UE 10 may perform the disclosed method for use cases where HARQ-ACK is cancelled. Examples of other use cases may include the following.

Case 1: Time domain overlapping of high priority PUSCH and low priority PUCCH with HARQ-ACK feedback. In this case low priority PUCCH is canceled for transmission.

Case 2: In case 2, time domain overlapping of a high priority PUCCH with HARQ-ACK feedback and a low priority PUCCH with HARQ-ACK feedback occurs. In this case, transmission of the low priority PUCCH is cancelled by the UE.

Case 3: In case 3, the UE 10 receives a cancelation indicating DCI, and a cancellation range indicated by the cancelation indicating DCI includes a low priority PUSCH with piggybacked HARQ-ACK. In this case, transmission of the low priority PUSCH and the piggybacked HARQ-ACK in the low priority PUSCH is cancelled by the UE 10 in response to the cancelation indicating DCI. A priority level for HARQ-ACK feedback transmission in the adjusted slot or sub-slot location n+K1_adj may be dynamically indicated in a DCI.

In S13 and S14 of FIG. 3, the symbol used for the HARQ-ACK bit responding to the received SPS PDSCH is determined as an invalid symbol if the symbol is de-prioritized due to overlapping with higher priority uplink transmission, or the symbol is cancelled by a base station.

Embodiment 2

Embodiments of the disclosed method may perform SPS PDSCH skipping to reduce feedback overhead.

Embodiment 2-1

In the embodiment, the one or more SPS PDSCHs in FIG. 2 are one or more SPS PDSCHs which are actually transmitted on the plurality of periodic SPS PDSCH resources. The UE 10 determines the one or more actually transmitted SPS PDSCHs based on detection of a DM-RS sequence within each of the plurality of periodic SPS PDSCH resources.

The UE 10 may perform SPS PDSCH skipping based on PDSCH detection. The UE 10 can determine whether one or more SPS PDSCHs are actually transmitted, only report and transmit HARQ-ACKs corresponding to the actually transmitted one or more SPS PDSCHs. The UE 10 can determine whether one or more SPS PDSCHs are actually transmitted based on one or more of the following schemes:

Using existing legacy DM-RS sequence for DM-RS detection of PDSCH occasions; and Using specifically designed DM-RS sequence for DM-RS detection of PDSCH occasions.

In the case of DM-RS detection of PDSCH occasions using a specifically designed DM-RS sequence, DM-RS sequence assignment can include one of the following options:

DM-RS sequence with different formats can be transmitted in different slot or sub-slot locations carrying SPS PDSCH(s); and The specifically designed DM-RS sequence can carry additional information.

For example, the DM-RS sequence provides information of:

existence of the one or more actually transmitted SPS PDSCHs in a current slot or sub-slot;

a slot or sub-slot location of the one or more actually transmitted SPS PDSCHs; or a HARQ-ACK feedback scheme of the one or more actually transmitted SPS PDSCHs.

For example, the HARQ-ACK feedback scheme of the additional information carried in the specifically designed DM-RS sequence may comprise one or more of the following:

An indication shows whether a function of SPS PDSCH skipping for a non-transmitted SPS PDSCH is activated or not; and An indication to indicate UE whether the HARQ-ACK feedback of currently received SPS PDSCH needs to be transmitted or not.

The UE 10 may determine whether to transmit HARQ-ACK feedback of a currently received SPS PDSCH based on one of the following possible conditions:

If decoding result of the currently received SPS PDSCH turns out an ACK, the UE 10 transmits the ACK as HARQ-ACK for the currently received SPS PDSCH.

If decoding result of the currently received SPS PDSCH turns out a NACK, the UE 10 transmits the NACK as HARQ-ACK for the currently received SPS PDSCH.

The UE 10 skips HARQ-ACK for the currently received SPS PDSCH regardless of any decoding result of the currently received SPS PDSCH.

In an embodiment, the HARQ-ACK feedback scheme includes:

skipping HARQ-ACK feedback of a corresponding SPS PDSCH;

transmitting HARQ-ACK feedback of the corresponding SPS PDSCH only if a decoding result of the corresponding SPS PDSCH is ACK; or transmitting HARQ-ACK feedback of the corresponding SPS PDSCH only if the decoding result of the corresponding SPS PDSCH is NACK.

Embodiment 2-2

The gNB 20 indicates actual SPS PDSCH transmission locations to the UE. The actual SPS PDSCH transmission locations are locations where one or more SPS PDSCHs are actually transmitted within a pre-determined period of time, such as a slot or sub-slot.

Scheme 1: In an embodiment, the gNB 20 sends to the UE 10 an SPS PDSCH location indication showing the locations where one or more SPS PDSCHs are actually transmitted within a pre-determined period of time using RRC signaling or activation DCI. The UE 10 determines to select the one or more SPS PDSCHs which are actually transmitted on the plurality of periodic SPS PDSCH resources based on the SPS PDSCH location indication in an RRC configuration or DCI indication. Based on the location of SPS PDSCHs indicated by the gNB 20, the UE 10 only transmits HARQ-ACKs for one or more SPS PDSCHs that are actually transmitted. The indication of the locations where one or more SPS PDSCHs are actually transmitted may include one of the following options:

Option 1: Bitmap indication. The SPS PDSCH location indication may include a bitmap pattern or an index to the bitmap pattern to indicate location(s) of the one or more actually transmitted SPS PDSCHs within a pre-determined period of time. Similar to semi-static TDD configuration, the gNB 20 may use a bitmap to indicate the actual SPS PDSCH transmission locations within the pre-determined period of time, such as a slot or sub-slot, using semi-static or UE-specific RRC configuration.

Option 2: Table mapping. The SPS PDSCH location indication may include a mapping table or an index to the mapping table to indicate location(s) of the one or more actually transmitted SPS PDSCHs within a pre-determined period of time. The gNB 20 may use the configurable mapping table to indicate the actual SPS PDSCH transmission locations within the pre-determined period of time, such as a slot or sub-slot. Each row index of the mapping table may map to a series of binary pattern to indicate the locations where one or more SPS PDSCHs are actually transmitted within the pre-determined period of time. The gNB 20 may indicate a row index in an RRC signal or activation DCI.

Above location indication scheme can be configured individually per activated SPS configuration or can be configured jointly for all activated SPS configurations in the time domain. The pre-determined period of time can be configured by the gNB 20 using RRC signaling (i.e., an RRC configuration). The SPS PDSCH location indication may be configured per SPS configuration or per group of SPS configurations.

Scheme 2: In an embodiment, the gNB 20 indicates to UE 10 periodic resource locations where one or more SPS PDSCHs are actually transmitted using a legacy scheme, such as RRC signaling for periodicity or activation DCI for time or frequency resources. In addition, the gNB 20 may provide additional information indicating transmission periodicity of actually transmitted SPS PDSCHs for the UE 10 to periodically access the actually transmitted SPS PDSCHs. The transmission periodicity of actually transmitted SPS PDSCHs may be longer than resource periodicity configured for the SPS PDSCH, and can be configured individually per activated SPS configuration or can be configured jointly for all activated SPS configurations. The gNB 20 may dynamically index the transmission periodicity using a mapping table and indicate the transmission periodicity via activation DCI or via RRC signaling. The UE 10 may perform receiving operations for the actually transmitted SPS PDSCH. Some examples of the receiving operations are detailed in the following.

For example, the SPS PDSCH location indication includes transmission periodicity of the one or more actually transmitted SPS PDSCHs. The UE 10 monitors SPS PDSCH resources configured by gNB 20 and detects actually transmitted one or more SPS PDSCHs, e.g., via DM-RS. Upon detecting one of the actually transmitted one or more SPS PDSCHs successfully, the UE 10 may skip monitoring and detection for a period of time based on the transmission periodicity given by the gNB 20 and resume to detect and decode SPS PDSCH accordingly.

Scheme 3: In an embodiment, the SPS PDSCH location indication includes one or more candidate locations for transmission of the one or more actually transmitted SPS PDSCHs within a pre-determined period of time. To reducing detection efforts by narrowing down detecting targets for the UE, the gNB 20 can indicates to the UE 10 several possible locations where SPS PDSCHs can be transmitted within a pre-determined period of time. A possible location may be referred to as a candidate location. Indication of these locations can reuse the options provided in Scheme 1 of embodiment 2-2. For each pre-determined period of time, the UE 10 may try to detect one or more actually transmitted SPS PDSCHs based on these possible locations.

Scheme 4: In a combination of Scheme 2 and Scheme 3, the gNB 20 indicates to the UE 10 two or more possible locations where SPS PDSCHs can be transmitted within a pre-determined period of time, along with information indicating transmission periodicity of the actually transmitted one or more SPS PDSCHs. This scheme restricts possible locations for UE 10 to perform SPS PDSCH detection. Upon successfully detecting one of actually transmitted one or more SPS PDSCHs, the UE 10 may skip monitoring and detection for a period of time based on the transmission periodicity given by the gNB 20. The UE 10 can resume to detect and decode actually transmitted one or more SPS PDSCHs at exact time locations. In this scheme, except for the first pre-determined period of time during which the UE 10 successfully detects SPS PDSCHs over possible locations for the first time, the UE 10 does not need to detect every SPS PDSCH candidate for each pre-determined period of time.

Embodiment 2-2-1

Figure 9:
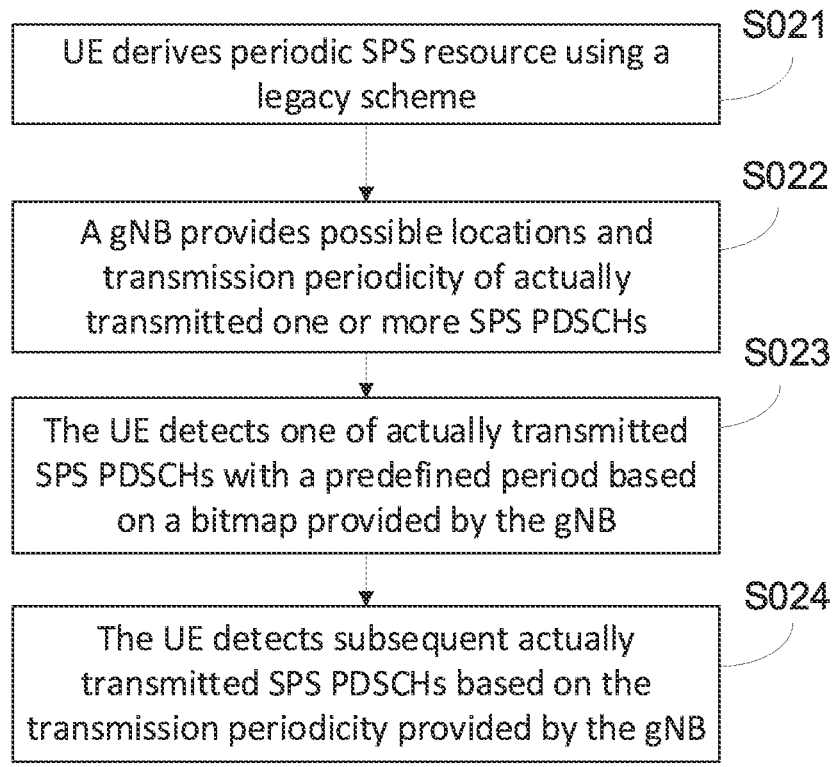
FIG. 9 illustrates a schematic view showing a procedure for UE detecting actually transmitted SPS PDSCH.

FIG. 9 shows a procedure for UE 10 detecting actually transmitted SPS PDSCH, taking Scheme 4 as an example.

Step 1: The UE 10 derives periodic resource location of SPS PDSCH from the gNB 20 using a legacy scheme (S021).

Step 2: The gNB 20 provides possible locations of the actually transmitted one or more SPS PDSCHs within a pre-determined period of time using, e.g., a bitmap, as well as transmission periodicity of actual SPS PDSCH transmission (S022).

Step 3: The UE 10 detects the actually transmitted one or more SPS PDSCHs among SPS PDSCH candidates with a pre-determined period of time (S023).

Step 4: Once the UE 10 has successfully detected one actually transmitted SPS PDSCH, the UE 10 may decode other actually transmitted SPS PDSCHs based on the transmission periodicity provided by the gNB 20 (S024).

Embodiment 3

Some embodiments of the disclosed method provide conditional HARQ-ACK feedback schemes. The conditional feedback schemes for reducing HARQ-ACK feedback overhead are detailed in the following.

Embodiment 3-1

Activation of HARQ-ACK skipping can be indicated by the gNB 20 using activation DCI or RRC signaling. The UE 10 may determine to skip transmission of the constructed HARQ-ACK codebook according to a feedback skipping condition and transmits a non-skipped HARQ-ACK codebook on uplink resources. The UE 10 can perform HARQ-ACK skipping to skip the transmission of HARQ-ACK feedback according to at least one of the following conditions.

Case 1-1: Skipping all the HARQ-ACK bit(s) if all the HARQ-ACKs are NACK;
Case 1-2: Skipping the HARQ-ACK bit(s) of NACK;
Case 2-1: Skipping all the HARQ-ACK bit(s) if all the HARQ-ACK bits are ACK;
Case 2-2: Skipping the HARQ-ACK bit(s) of ACK;
Case 3: Skipping the HARQ-ACK bit(s) if one or more corresponding SPS PDSCH that cannot be detected;

Case 4: Skipping the HARQ-ACK bit(s) for one or more SPS configuration indexes. An SPS configuration index for HARQ-ACK skipping can be indicated by gNB 20 using activation DCI or RRC signaling.

Case 5: Skipping the HARQ-ACK feedback(s) if any of above skipping conditions is met and the total skipped HARQ-ACK bit size is larger than a given threshold value. The threshold value can be provided by the gNB 20 using activation DCI or RRC signaling.

The gNB 20 may indicate to the UE 10 the feedback skipping condition in DCI or RRC signaling. In an embodiment, the feedback skipping condition comprises one or more of:

skipping a HARQ-ACK codebook if all HARQ-ACK bits in the HARQ-ACK codebook are NACK;

skipping a HARQ-ACK codebook if all HARQ-ACK bits in the HARQ-ACK codebook are ACK;

skipping a HARQ-ACK codebook if a number of excluded HARQ-ACK bits in the HARQ-ACK codebook is greater than a threshold; and not skipping the HARQ-ACK codebook.

In particular, the feedback reduction condition comprises one or more of:

excluding a HARQ-ACK bit for a decoded SPS PDSCH from the HARQ-ACK codebook if a decoding result of the decoded SPS PDSCH is a NACK;

excluding a HARQ-ACK bit for a decoded SPS PDSCH from the HARQ-ACK codebook if a decoding result of the decoded SPS PDSCH is an ACK;

excluding a HARQ-ACK bit for an SPS PDSCH resource from the HARQ-ACK codebook if no SPS PDSCH is actually transmitted on the SPS PDSCH resource;

excluding a HARQ-ACK bit for a decoded SPS PDSCH from the HARQ-ACK codebook if the decoded SPS PDSCH belongs to an SPS configuration index;

excluding a HARQ-ACK bit for a decoded SPS PDSCH from the HARQ-ACK codebook if the decoded SPS PDSCH belongs to a priority level; and not excluding any HARQ-ACK bit be added to the HARQ-ACK codebook.

Embodiment 3-2

The UE 10 may reduce one or more HARQ-ACK bits to be added to the HARQ-ACK codebook according to the feedback reduction condition based on bundling of the one or more HARQ-ACK bits. In an embodiment, the UE 10 can bundle a group of HARQ-ACK bits to a single feedback bit to reduce the HARQ-ACK feedback overhead.

Scheme 1: HARQ-ACK Bundling Across SPS Configurations.

In an embodiment, HARQ-ACK bundling may be configured across SPS configurations. In other words, HARQ-ACK bundling may be configured for a plurality of SPS configurations. For example, the gNB 20 determines and configures one or more SPS configurations belonging to the same traffic type or the same priority level as an SPS configuration group for performing HARQ-ACK bundling during HARQ-ACK feedback. The gNB 20 may configure an SPS configuration group via RRC signaling. Configuration of the group of SPS configurations may be indicated by the gNB 20 in DCI or RRC signaling. One or more HARQ-ACKs for SPS configurations belong to the same SPS configuration group can be bundled into a single feedback bit. In an embodiment, in S6 of FIG. 2, the one or more HARQ-ACK bits of the one or more SPS PDSCHs that belong to a group of SPS configurations are bundled and transmitted according to a HARQ-ACK feedback timing. The group of SPS configurations may belong to the same traffic type.

Activation of HARQ-ACK bundling may be configured per SPS configuration or per SPS configuration group. For example, the gNB 20 may indicate activation of HARQ-ACK feedback bundling in activation DCI or via RRC signaling. The gNB 20 may perform HARQ-ACK bundling based on one or more of the following conditions:

a codebook size limitation;

a traffic type or a priority level for each SPS configuration;

a latency requirement of SPS traffic, which is reflected in the periodicity of SPS configuration; and a reliability requirement of SPS traffic.

For example, the HARQ-ACK feedback transmitted in the adjusted slot or sub-slot location n+K1_adj comprises HARQ-ACK bits of SPS PDSCH with a corresponding priority level.

The HARQ-ACK feedback timing of the bundled one or more HARQ-ACK bits may be determined based on a HARQ-ACK feedback timing of one SPS configuration in the group of SPS configurations. The SPS configuration in the group of SPS configurations may be referred to as an active SPS configuration. A reference HARQ-ACK feedback timing for HARQ-ACK bundling can be based on one active SPS configuration selected by the gNB 20, which may be referred to as a reference SPS configuration. Other SPS configurations belonging to the same SPS configuration group of reference SPS configuration follow the same feedback timing for bundled HARQ-ACK feedback. The UE 10 determines the active SPS configuration selected by the gNB 20 and performs HARQ-ACK bundling according to the HARQ-ACK feedback timing of the active SPS configuration.

Scheme 2: HARQ-ACK bundling across feedback occasions per SPS configuration.

In an embodiment, HARQ-ACK bundling may be configured across HARQ-ACK feedback occasions per SPS configuration. That is, for an SPS configuration, HARQ-ACK bundling may be configured for a plurality of HARQ-ACK feedback occasions. The gNB 20 can determine and configure a HARQ-ACK feedback period for HARQ-ACK bundling per SPS configuration. The feedback period can be determined according to a periodicity of a TDD configuration, or a pre-determined period of time configured by gNB 20. The periodicity of the TDD configuration is periodicity of a downlink-uplink pattern for time-division duplexing (TDD) transmission. When performing HARQ-ACK bundling across feedback occasions, the UE 10 can bundle one or more HARQ-ACKs within the feedback period to a single feedback bit. In an embodiment, in S6 of FIG. 2, the one or more HARQ-ACK bits of the one or more SPS PDSCHs that belong to the group of SPS configurations are bundled within the feedback period and transmitted according to the HARQ-ACK feedback timing.

The gNB 20 can indicate to the UE 10 activation of the HARQ-ACK bundling per SPS configuration in activation DCI or via RRC signaling. Activation of HARQ-ACK bundling can be indicated in activation DCI or via RRC signaling. The gNB 20 can configure HARQ-ACK bundling based on one or more of the following conditions:

a codebook size limitation;

a traffic type or a priority level for each SPS configuration;

a latency requirement of SPS traffic, which is reflected in the periodicity of SPS configuration; and a reliability requirement of SPS traffic.

The reference HARQ-ACK feedback timing for HARQ-ACK bundling can be based on one SPS PDSCH location within the feedback period, e.g., reference SPS PDSCH, and the K1 value is applied to the reference SPS PDSCH. The gNB 20 may configure the feedback period in a downlink control signal and send the downlink control signal to the UE 10. Reference SPS PDSCH can be determined by gNB 20 via RRC signaling or activation DCI. For example, Reference SPS PDSCH is the last SPS PDSCH within a feedback period.

Embodiment 3-3

In an embodiment, according to a configuration of HARQ-ACK-less feedback, the UE 10 can skip HARQ-ACK of an SPS PDSCH even if the SPS PDSCH is actually transmitted.

The gNB 20 can configure HARQ-ACK-less feedback per SPS configuration or per SPS configuration group. One or more SPS configurations form an SPS configuration group. For example, the gNB 20 may configure one or more SPS configurations belonging to the same traffic type or the same priority level to form an SPS configuration group. In an embodiment, the gNB 20 can configure HARQ-ACK less feedback for each of SPS configurations. In an embodiment, the gNB 20 can configure HARQ-ACK less feedback for each of SPS configuration groups.

The gNB 20 can determine whether to activate HARQ-ACK less feedback based on at least one of the following conditions:
  A priority level of SPS traffic.
  Latency requirement of SPS traffic
  Statistical result of decoding performance based on received HARQ-ACK in normal operation.
  Channel condition based on channel estimation result Embodiment 4

Embodiments of the disclosed method provide HARQ-ACK feedback latency reduction.

Embodiment 4-1

An embodiment of the disclosed method provides separate HARQ-ACK feedback for SPS PDSCHs. Two or more HARQ-ACK codebooks are constructed for HARQ-ACK bits for SPS PDSCHs on the plurality of periodic SPS PDSCH resources.

Scheme 1: Separated from non-SPS based scheduling, different SPS PDSCH codebooks are defined for different SPS traffic types. Thus, each SPS traffic type is associated with an SPS PDSCH codebook of either Type 1 (i.e., semi-static codebook) or Type 2 (i.e., dynamic codebook) defined for the SPS traffic type. An independent feedback timing and/or PUCCH resource(s) can be defined for SPS traffic specific codebook.

Scheme 2: In contrast to dynamic scheduling, an SPS PDSCH codebook of either Type 1 or Type 2 is defined for SPS PDSCHs without corresponding PDCCH (i.e., without activation DCI), independent feedback timing and/or PUCCH resource(s) can be defined for the codebook for SPS PDSCHs without corresponding PDCCH.

Scheme 3: A separate SPS PDSCH codebook of either Type 1 or Type 2 is defined for an SPS configuration group. Thus, different SPS configuration groups have different SPS PDSCH codebooks. One or more SPS configurations form an SPS configuration group, and each SPS PDSCH codebook of the corresponding SPS configuration group uses an independent feedback timing and/or PUCCH resource(s).

The HARQ-ACK bits for the SPS PDSCHs on the plurality of periodic SPS PDSCH resources are classified and be separately added to the two or more HARQ-ACK codebooks based on one or more of the following schemes:
  HARQ-ACK bits of the same SPS PDSCH traffic type are transmitted in the same HARQ-ACK codebook;
  HARQ-ACK bits of SPS PDSCHs with corresponding DCI scheduling the SPS PDSCHs are transmitted in the same HARQ-ACK codebook;
  HARQ-ACK bits of SPS PDSCHs without corresponding DCI scheduling the SPS PDSCHs are transmitted in the same HARQ-ACK codebook;
  HARQ-ACK bits of SPS PDSCHs belong to the same SPS configuration group are transmitted in the same HARQ-ACK codebook;
  HARQ-ACK bits of SPS PDSCHs with a decoding result of ACK are transmitted in the same HARQ-ACK codebook; and
  HARQ-ACK bits of SPS PDSCHs with a decoding result of NACK are transmitted in the same HARQ-ACK codebook.

Embodiment 4-2

An embodiment of the disclosed method provides separate HARQ-ACK feedback configurations for ACK feedback and NACK feedback respectively. The HARQ-ACK feedback configurations may comprise one or more of feedback timing, PUCCH resource, PUCCH resource size, and repetition number for HARQ-ACK feedback. The gNB 20 may provide the HARQ-ACK feedback configurations to the UE 10 in an RRC signal or DCI.

In an embodiment, each of ACK feedback and NACK feedback follows an independent feedback timing. That is, the UE 10 reports ACK feedback according to an ACK feedback timing and reports NACK feedback according to a NACK feedback timing. Thus, different configurations of feedback timing or different radio resources for HARQ-ACK feedback are adopted for different HARQ-ACK codebooks, and the radio resources for HARQ-ACK feedback comprise PUCCH resources or PUSCH resources. In an embodiment, one of the ACK feedback timing or the NACK feedback timing follows a legacy PUCCH scheduling scheme, and the other follows a pre-configured feedback timing as a new PUCCH scheduling scheme.

In an embodiment, ACK and NACK feedback may have different PUCCH resources in terms of PUCCH resource location and PUCCH resource size.

In an embodiment, different repetition numbers may be configured for ACK feedback and NACK feedback, respectively.

In an embodiment, different PUCCH resource sizes may be configured for ACK feedback and NACK feedback according to different reliability requirements.

Embodiment 5

An embodiment of the disclosed method performs valid target slot or sub-slot determination for SPS HARQ-ACK deferring (i.e., postponing SPS HARQ-ACK).

Embodiment 5-1

The target slot or sub-slot indicated by K1_adj can be determined as a valid slot or sub-slot for the transmission of deferred SPS HARQ-ACK (i.e., postponed SPS HARQ-ACK) if at least one of the following conditions is met:
  All symbols in the target slot or sub-slot used for transmission of deferred SPS HARQ-ACK are valid. For example, the one or more symbols in the slot or sub-slot location of n+K1_adj for transmission of the one or more HARQ-ACK bits in the HARQ-ACK codebook are one or more valid symbols not colliding with semi-static DL symbols, synchronization signal and PBCH blocks (SSBs), or control resource set zero (CORESET #0). The one or more symbols in the slot or sub-slot location of n+K1_adj for transmission of the one or more HARQ-ACK bits in the HARQ-ACK codebook are located in a PUCCH resource.
    The semi-static DL symbols may be configured in RRC signaling. PBCH stands for physical broadcast channel. The one or more valid symbols not colliding with semi-static DL symbols, SSB or CORESET #0 may be located in a PUCCH resource.
  At least one of the following PUCCH resources is configured and is available within the valid symbols of the target slot or sub-slot:
    An SPS PUCCH resource, e.g., in sps-PUCCH-AN-List-r16 or n1PUCCH-AN;
    A dynamic PUCCH resource, e.g., in PUCCH-ResourceSet;
    A channel state information (CSI) PUCCH resource, e.g., in multi-CSI-PUCCH-ResourceList; and/or
    An additional set of newly created SPS PUCCH resource, other than existing SPS PUCCH resource, e.g., SPS-PUCCH-AN-List-r16 or n1PUCCH-AN.
  To be more specific, the location of the PUCCH resource in the target slot or sub-slot for deferred SPS HARQ-ACK transmission can be configured by RRC signaling using RRC parameters such as sps-PUCCH-AN-List-r16 or n1PUCCH-AN, or indicated by DCI using a PUCCH resource index associated with a PUCCH resource in an RRC configured PUCCH-ResourceSet.

Embodiment 5-2

In an embodiment, the UE 10 may determine a valid target slot or sub-slot (n+K1_adj) for deferred SPS HARQ-ACK transmission based on HARQ-ACK codebook limitation. The UE 10 can select a proper target slot or sub-slot (n+K1_adj) for deferred HARQ-ACK transmission to meet one or more limitations of at least one of the following codebook features:
  A maximum allowable codebook size for deferred HARQ-ACK transmission only or for joint deferred and non-deferred HARQ-ACK transmission in the HARQ-ACK codebook;
  A restriction of codebook priority level for deferred HARQ-ACK transmission only or for joint deferred and non-deferred HARQ-ACK transmission in the HARQ-ACK codebook;
  A restriction of a codebook type for deferred HARQ-ACK transmission only or for joint deferred and non-deferred HARQ-ACK transmission in the HARQ-ACK codebook.
The codebook priority level is a priority level of the HARQ-ACK codebook. The codebook type is a codebook type of the HARQ-ACK codebook. The codebook types of the HARQ-ACK codebook may include existing type1, type 2, type3 codebook, or a newly defined codebook for HARQ-ACK retransmission in 3GPP standard Rel. 17. In an embodiment, the adjusted slot or sub-slot location n+K1_adj is determined based on a total HARQ-ACK feedback size of joint deferred and non-deferred HARQ-ACK transmission in the HARQ-ACK codebook.

One or more of the suitable codebook features used for deferred HARQ-ACK transmission can be configured by the gNB 20 and indicated to the UE 10 in a downlink control signal.

Embodiment 5-3

The UE 10 may determine a valid slot or sub-slot for deferred SPS HARQ-ACK transmission based on a maximum number of slots or sub-slots for deferral (i.e., a maximum value of K1_offset) from the initial slot or sub-slot determined by n+K1 in the activation DCI or dl-DataToUL-ACK in RRC configuration to the target slot or sub-slot determined by n+K1+K1_offset. The maximum number of slot or sub-slot for deferral serves as an upper limit or a threshold for a number of slots or sub-slots for deferral. The maximum value of K1_offset serves as an upper limit or a threshold for K1_offset. The UE 10 can determine the target slot or sub-slot for deferred HARQ-ACK transmission which does not exceed the maximum number of slot or sub-slot for deferral (i.e., the maximum value of K1_offset). In another embodiment, the maximum number of slots or sub-slots for deferral can also be defined as the maximum value of K1_adj (i.e., K1+K1_offset), which indicates the maximum value of deferred HARQ-ACK feedback offset with respect to the received SPS PDSCH at slot or sub-slot n.

The maximum number of slot or sub-slot for deferred SPS HARQ-ACK transmission may be configured by the gNB 20 and is determined based on the latency requirements of HARQ-ACK feedback for specific SPS traffic and indicated to the UE 10 in a downlink control signal. The maximum number of slot or sub-slot for deferred SPS HARQ-ACK transmission may be referred to as maximum deferral time. Deferred HARQ-ACK transmission for SPS traffic may be referred to as SPS HARQ-ACK deferral. The maximum deferral time can be the same among all SPS configurations or independently configured per SPS configuration. The maximum value of the K1_adj or the maximum value K1_offset is configured per SPS configuration via RRC signaling. The maximum value of K1_adj serves as an upper limit or a threshold for K1_adj.

Embodiment 6

Configuration for deferred HARQ-ACK transmission may comprise a corresponding deferral range of K1_offset and/or activation or deactivation of SPS HARQ-ACK deferral. Embodiments of the gNB 20 configuring deferred HARQ-ACK transmission may comprise the following.
  Activation or deactivation of SPS HARQ-ACK deferral and/or a maximum deferred value (i.e., maximum value of K1_offset or maximum value of K1_adj) can be separately configured in each SPS configurations.
  Activation or deactivation of SPS HARQ-ACK deferral and/or a maximum deferred value (i.e., maximum value of K1_offset or maximum value of K1_adj) can be jointly configured for all SPS configurations.
  Activation or deactivation of SPS HARQ-ACK deferral and the maximum deferred value (i.e., maximum value of K1_offset or maximum value of K1_adj) can be jointly encoded in RRC configuration or in a DCI field.
  For example, in the configuration for deferred HARQ-ACK transmission, if the maximum number of slot or sub-slot for deferral is 0, the SPS HARQ-ACK deferral is deactivated or the SPS HARQ-ACK(s) transmission is deferred to a PUCCH resource with valid symbol(s) in the same slot or sub-slot location n+K1. In an embodiment, the adjustment of the HARQ-ACK feedback timing is deactivated or the SPS HARQ-ACK(s) transmission is deferred to a PUCCH resource with valid symbol(s) in the same slot or sub-slot location n+K1 if a maximum value of K1_offset is set to 0. In an embodiment, adjustment of the HARQ-ACK feedback timing is activated or deactivated using a DCI or RRC signal. The activation or deactivation of the adjustment of the HARQ-ACK feedback timing may be configured per SPS configuration.

Embodiment 7

Any schemes, options, and examples in each of the embodiments, either for avoiding HARQ-ACK dropping or for reducing HARQ-ACK feedback overhead, can be adopted to work together using various combinations for different purposes.

Figure 10:
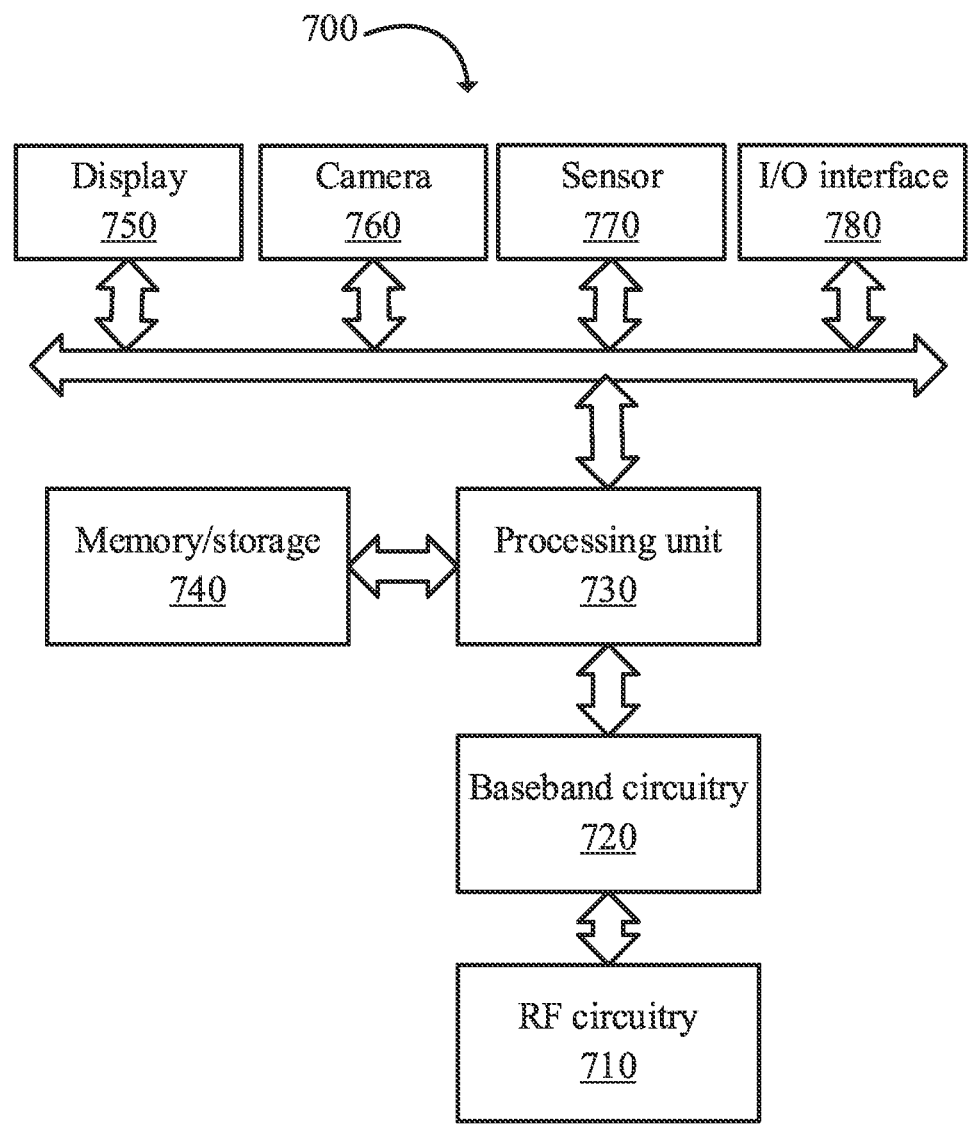
FIG. 10 illustrates a schematic view showing a system for wireless communication according to an embodiment of the present disclosure.

FIG. 10 is a block diagram of an example system 700 for wireless communication according to an embodiment of the present disclosure. Embodiments described herein may be implemented into the system using any suitably configured hardware and/or software. FIG. 10 illustrates the system 700 including a radio frequency (RF) circuitry 710, a baseband circuitry 720, a processing unit 730, a memory/storage 740, a display 750, a camera 760, a sensor 770, and an input/output (I/O) interface 780, coupled with each other as illustrated.

The processing unit 730 may include circuitry, such as, but not limited to, one or more single-core or multi-core processors. The processors may include any combinations of general-purpose processors and dedicated processors, such as graphics processors and application processors. The processors may be coupled with the memory/storage and configured to execute instructions stored in the memory/storage to enable various applications and/or operating systems running on the system.

The baseband circuitry 720 may include circuitry, such as, but not limited to, one or more single-core or multi-core processors. The processors may include a baseband processor. The baseband circuitry may handle various radio control functions that enable communication with one or more radio networks via the RF circuitry. The radio control functions may include, but are not limited to, signal modulation, encoding, decoding, radio frequency shifting, etc. In some embodiments, the baseband circuitry may provide for communication compatible with one or more radio technologies. For example, in some embodiments, the baseband circuitry may support communication with 5G NR, LTE, an evolved universal terrestrial radio access network (EUTRAN) and/or other wireless metropolitan area networks (WMAN), a wireless local area network (WLAN), a wireless personal area network (WPAN). Embodiments in which the baseband circuitry is configured to support radio communications of more than one wireless protocol may be referred to as multi-mode baseband circuitry. In various embodiments, the baseband circuitry 720 may include circuitry to operate with signals that are not strictly considered as being in a baseband frequency. For example, in some embodiments, baseband circuitry may include circuitry to operate with signals having an intermediate frequency, which is between a baseband frequency and a radio frequency.

The RF circuitry 710 may enable communication with wireless networks using modulated electromagnetic radiation through a non-solid medium. In various embodiments, the RF circuitry may include switches, filters, amplifiers, etc. to facilitate communication with the wireless network. In various embodiments, the RF circuitry 710 may include circuitry to operate with signals that are not strictly considered as being in a radio frequency. For example, in some embodiments, RF circuitry may include circuitry to operate with signals having an intermediate frequency, which is between a baseband frequency and a radio frequency.

In various embodiments, the transmitter circuitry, control circuitry, or receiver circuitry discussed above with respect to the UE, eNB, or gNB may be embodied in whole or in part in one or more of the RF circuitries, the baseband circuitry, and/or the processing unit. As used herein, "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the electronic device circuitry may be implemented in, or functions associated with the circuitry may be implemented by, one or more software or firmware modules. In some embodiments, some or all of the constituent components of the baseband circuitry, the processing unit, and/or the memory/storage may be implemented together on a system on a chip (SOC).

The memory/storage 740 may be used to load and store data and/or instructions, for example, for the system. The memory/storage for one embodiment may include any combination of suitable volatile memory, such as dynamic random access memory (DRAM)), and/or non-volatile memory, such as flash memory. In various embodiments, the I/O interface 780 may include one or more user interfaces designed to enable user interaction with the system and/or peripheral component interfaces designed to enable peripheral component interaction with the system. User interfaces may include, but are not limited to a physical keyboard or keypad, a touchpad, a speaker, a microphone, etc. Peripheral component interfaces may include, but are not limited to, a non-volatile memory port, a universal serial bus (USB) port, an audio jack, and a power supply interface.

In various embodiments, the sensor 770 may include one or more sensing devices to determine environmental conditions and/or location information related to the system. In some embodiments, the sensors may include, but are not limited to, a gyro sensor, an accelerometer, a proximity sensor, an ambient light sensor, and a positioning unit. The positioning unit may also be part of, or interact with, the baseband circuitry and/or RF circuitry to communicate with components of a positioning network, e.g., a global positioning system (GPS) satellite. In various embodiments, the display 750 may include a display, such as a liquid crystal display and a touch screen display. In various embodiments, the system 700 may be a mobile computing device such as, but not limited to, a laptop computing device, a tablet computing device, a netbook, an ultrabook, a smartphone, etc. In various embodiments, the system may have more or less components, and/or different architectures. Where appropriate, the methods described herein may be implemented as a computer program. The computer program may be stored on a storage medium, such as a non-transitory storage medium.

The embodiment of the present disclosure is a combination of techniques/processes that may be adopted in 3GPP specification to create an end product.

A person having ordinary skill in the art understands that each of the units, algorithm, and steps described and disclosed in the embodiments of the present disclosure are realized using electronic hardware or combinations of software for computers and electronic hardware. Whether the functions run in hardware or software depends on the condition of the application and design requirement for a technical plan. A person having ordinary skill in the art may use different ways to realize the function for each specific application while such realizations should not go beyond the scope of the present disclosure. It is understood by a person having ordinary skill in the art that he/she may refer to the working processes of the system, device, and unit in the above-mentioned embodiment since the working processes of the above-mentioned system, device, and unit are basically the same. For easy description and simplicity, these working processes will not be detailed.

It is understood that the disclosed system, device, and method in the embodiments of the present disclosure may be realized in other ways. The above-mentioned embodiments are exemplary only. The division of the units is merely based on logical functions while other divisions exist in realization. It is possible that a plurality of units or components are combined or integrated into another system. It is also possible that some characteristics are omitted or skipped. On the other hand, the displayed or discussed mutual coupling, direct coupling, or communicative coupling operate through some ports, devices, or units whether indirectly or communicatively by ways of electrical, mechanical, or other kinds of forms.

The units as separating components for explanation are or are not physically separated. The units for display are or are not physical units, that is, located in one place or distributed on a plurality of network units. Some or all of the units are used according to the purposes of the embodiments. Moreover, each of the functional units in each of the embodiments may be integrated into one processing unit, physically independent, or integrated into one processing unit with two or more than two units.

If the software function unit is realized and used and sold as a product, it may be stored in a readable storage medium in a computer. Based on this understanding, the technical plan proposed by the present disclosure may be essentially or partially realized as the form of a software product. Or, one part of the technical plan beneficial to the conventional technology may be realized as the form of a software product. The software product in the computer is stored in a storage medium, including a plurality of commands for a computational device (such as a personal computer, a server, or a network device) to run all or some of the steps disclosed by the embodiments of the present disclosure. The storage medium includes a USB disk, a mobile hard disk, a read-only memory (ROM), a random access memory (RAM), a floppy disk, or other kinds of media capable of storing program codes.

Embodiments of the disclosure may be applied to HARQ-ACK feedback for URLLC or IIoT to reduce SPS PDSCH feedback latency and enhance HARQ-ACK transmission reliability.

While the present disclosure has been described in connection with what is considered the most practical and preferred embodiments, it is understood that the present disclosure is not limited to the disclosed embodiments but is intended to cover various arrangements made without departing from the scope of the broadest interpretation of the appended claims.

What is claimed is:

1. A hybrid automatic repeat request (HARQ) processing method executable by a user equipment (UE), comprising:
    monitoring a plurality of periodic semi persistent scheduling (SPS) physical downlink shared channel (PDSCH) resources configured through radio resource control (RRC) signaling;
    determining selected one or more SPS PDSCHs on the plurality of periodic SPS PDSCH resources;
    decoding the selected one or more SPS PDSCHs; and
    performing HARQ-acknowledgement (HARQ-ACK) feedback for the selected one or more SPS PDSCHs in response to the decoding by constructing a HARQ-ACK codebook to include one or more HARQ-ACK bits for the selected one or more SPS PDSCHs, wherein the selected one or more SPS PDSCHs are one or more SPS PDSCHs selected from one or more resource locations of the plurality of periodic SPS PDSCH resources.

2. The HARQ processing method of claim 1, wherein the selected one or more SPS PDSCHs are one or more SPS PDSCHs which are actually transmitted on the plurality of periodic SPS PDSCH resources, the UE determines the selected one or more actually transmitted SPS PDSCHs based on detection of a DM-RS sequence within each of the plurality of periodic SPS PDSCH resources.

3. The HARQ processing method of claim 2, wherein the DM-RS sequence provides information of:
    existence of the one or more actually transmitted SPS PDSCHs in a current slot or sub-slot;
    a slot or sub-slot location of the one or more actually transmitted SPS PDSCHs; or
    a HARQ-ACK feedback scheme of the one or more actually transmitted SPS PDSCHs.

4. The HARQ processing method of claim 3, wherein the HARQ-ACK feedback scheme includes:
    skipping HARQ-ACK feedback of a corresponding SPS PDSCH;
    transmitting HARQ-ACK feedback of the corresponding SPS PDSCH only if a decoding result of the corresponding SPS PDSCH is ACK; or
    transmitting HARQ-ACK feedback of the corresponding SPS PDSCH only if the decoding result of the corresponding SPS PDSCH is NACK.

5. The HARQ processing method of claim 1, wherein the selected one or more SPS PDSCHs are one or more SPS PDSCHs which are actually transmitted on the plurality of periodic SPS PDSCH resources, wherein UE determines the selected one or more SPS PDSCHs based on an SPS PDSCH location indication in an RRC configuration or downlink control information (DCI) indication.

6. The HARQ processing method of claim 5, wherein the SPS PDSCH location indication includes a bitmap pattern or an index to the bitmap pattern to indicate one or more locations of the one or more actually transmitted SPS PDSCHs within a pre-determined period of time.

7. The HARQ processing method of claim 6, wherein the pre-determined period of time is configured through an RRC configuration.

8. The HARQ processing method of claim 5, wherein the SPS PDSCH location indication is configured per SPS configuration or per group of SPS configurations.

9. The HARQ processing method of claim 5, wherein the SPS PDSCH location indication includes a transmission periodicity of the one or more actually transmitted SPS PDSCHs.

10. The HARQ processing method of claim 5, wherein the SPS PDSCH location indication includes one or more candidate locations for transmission of the one or more actually transmitted SPS PDSCHs within a pre-determined period of time.

11. The HARQ processing method of claim 1, wherein SPS PDSCHs are transmitted on every resource of the plurality of periodic SPS PDSCH resources, and the UE determines all the SPS PDSCHs on the plurality of periodic SPS PDSCH resources as the selected one or more SPS PDSCHs.

12. The HARQ processing method of claim 1, further comprising reducing one or more HARQ-ACK bits to be added to the HARQ-ACK codebook if a feedback reduction condition is satisfied.

13. The HARQ processing method of claim 12, wherein the feedback reduction condition is indicated in DCI or RRC signaling.

14. The HARQ processing method of claim 12, wherein the feedback reduction condition comprises one or more of:
    excluding a HARQ-ACK bit for a decoded SPS PDSCH from the HARQ-ACK codebook if a decoding result of the decoded SPS PDSCH is a NACK;
    excluding a HARQ-ACK bit for a decoded SPS PDSCH from the HARQ-ACK codebook if a decoding result of the decoded SPS PDSCH is an ACK;
    excluding a HARQ-ACK bit for an SPS PDSCH resource from the HARQ-ACK codebook if no SPS PDSCH is actually transmitted on the SPS PDSCH resource;
    excluding a HARQ-ACK bit for a decoded SPS PDSCH from the HARQ-ACK codebook if the decoded SPS PDSCH belongs to a specific SPS configuration index; and
    excluding a HARQ-ACK bit for a decoded SPS PDSCH from the HARQ-ACK codebook if the decoded SPS PDSCH belongs to a certain priority level.

15. The HARQ processing method of claim 14, wherein the specific SPS configuration index or the certain priority level is indicated in DCI or RRC signaling.

16. The HARQ processing method of claim 1, wherein the one or more HARQ-ACK bits to be added to the HARQ-ACK codebook are reduced based on bundling of the one or more HARQ-ACK bits.

17. The HARQ processing method of claim 16, wherein one or more SPS configurations of periodic SPS PDSCH resources are configured through an RRC signaling, and the one or more HARQ-ACK bits of the one or more SPS PDSCHs that belong to the same group of SPS configurations are bundled and transmitted according to a HARQ-ACK feedback timing.

18. The HARQ processing method of claim 17, wherein the group of SPS configurations belong to the same traffic type.

19. The HARQ processing method of claim 17, wherein configuration of the group of SPS configurations is indicated in DCI or RRC signaling.

20. The HARQ processing method of claim 17, wherein the HARQ-ACK feedback timing of the bundled one or more HARQ-ACK bits is determined based on a HARQ-ACK feedback timing of one SPS configuration in the group of the SPS configurations.

21. The HARQ processing method of claim 17, wherein the one or more HARQ-ACK bits of the one or more SPS PDSCHs that belong to the group of SPS configurations are bundled within a feedback period.

22. The HARQ processing method of claim 16, wherein the one or more HARQ-ACK bits of the one or more SPS PDSCHs that belong to the same SPS configuration are bundled and transmitted according to a HARQ-ACK feedback timing.

23. The HARQ processing method of claim 22, wherein the HARQ-ACK feedback timing is based on an SPS PDSCH location within a feedback period.

24. The HARQ processing method of claim 23, wherein the feedback period is determined according to periodicity of a TDD configuration, and the periodicity of the TDD configuration is periodicity of a downlink-uplink pattern for time-division duplexing (TDD) transmission.

25. The HARQ processing method of claim 23, wherein the feedback period is configured in RRC signaling.

26. The HARQ processing method of claim 1, further comprising:
    determining to skip transmission of the constructed HARQ-ACK codebook if a feedback skipping condition is satisfied.

27. The HARQ processing method of claim 26, wherein the feedback skipping condition is indicated in DCI or RRC signaling.

28. The HARQ processing method of claim 26, wherein the feedback skipping condition comprises one or more of:
    skipping transmission of the constructed HARQ-ACK codebook if all HARQ-ACK bits in the HARQ-ACK codebook are NACK;
    skipping transmission of the constructed HARQ-ACK codebook if all HARQ-ACK bits in the HARQ-ACK codebook are ACK; and
    skipping transmission of the constructed HARQ-ACK codebook if a number of excluded HARQ-ACK bits in the HARQ-ACK codebook is greater than a threshold.

29. The HARQ processing method of claim 28, wherein the threshold is indicated in DCI or RRC signaling.

30. The HARQ processing method of claim 1, wherein two or more HARQ-ACK codebooks are constructed to include HARQ-ACK bits for SPS PDSCHs on the plurality of periodic SPS PDSCH resources.

31. The HARQ processing method of claim 30, wherein one or more SPS configurations of periodic SPS PDSCH resources are configured through an RRC signaling, and the HARQ-ACK bits for the SPS PDSCHs on the plurality of periodic SPS PDSCH resources are classified and be separately added to the two or more HARQ-ACK codebooks based on one or more of the following schemes:
    HARQ-ACK bits of the same SPS configuration are transmitted in the same HARQ-ACK codebook;
    HARQ-ACK bits of SPS PDSCHs with corresponding DCI scheduling the SPS PDSCHs are transmitted in the same HARQ-ACK codebook;
    HARQ-ACK bits of SPS PDSCHs without corresponding DCI scheduling the SPS PDSCHs are transmitted in the same HARQ-ACK codebook;
    HARQ-ACK bits of SPS PDSCHs belong to the same SPS configuration group or the same SPS PDSCH traffic type are transmitted in the same HARQ-ACK codebook;
    HARQ-ACK bits of SPS PDSCHs with a decoding result of ACK are transmitted in the same HARQ-ACK codebook; and
    HARQ-ACK bits of SPS PDSCHs with a decoding result of NACK are transmitted in the same HARQ-ACK codebook.

32. The HARQ processing method of claim 30, wherein different configurations of feedback timing or different radio resources for HARQ-ACK feedback are adopted for different HARQ-ACK codebooks, and the radio resources for HARQ-ACK feedback comprise PUCCH resources or physical uplink shared channel (PUSCH) resources.

33. A user equipment (UE) comprising:
a processor configured to call and run a computer program stored in a memory, to cause a device in which the chip is installed to execute a method of claim 1.

34. A chip, comprising:
a processor, configured to call and run a computer program stored in a memory, to cause a device in which the chip is installed to execute a method of claim 1.

35. A non-transitory computer-readable storage medium, in which a computer program is stored, wherein the computer program causes a computer to execute a method of claim 1.

36. A hybrid automatic repeat request (HARQ) processing method executable by a base station, comprising:
allocating a plurality of periodic semi persistent scheduling (SPS) physical downlink shared channel (PDSCH) resources configured through radio resource control (RRC) signaling;
receiving HARQ-acknowledgement (HARQ-ACK) feedback for selected one or more SPS PDSCHs on the plurality of periodic SPS PDSCH resources by receiving a HARQ-ACK codebook that includes one or more HARQ-ACK bits for the selected one or more SPS PDSCHs, wherein the selected one or more SPS PDSCHs are one or more SPS PDSCHs selected from one or more resource locations of the plurality of periodic SPS PDSCH resources.

37. The HARQ processing method of claim 36, wherein the selected one or more SPS PDSCHs are one or more SPS PDSCHs which are selected and actually transmitted by the base station on the plurality of periodic SPS PDSCH resources, the UE determines the selected one or more actually transmitted SPS PDSCHs based on detection of a DM-RS sequence within each of the plurality of periodic SPS PDSCH resources.

38. The HARQ processing method of claim 37, wherein the DM-RS sequence provides information of:
existence of the one or more actually transmitted SPS PDSCHs in a current slot or sub-slot;
a slot or sub-slot location of the one or more actually transmitted SPS PDSCHs; or
a HARQ-ACK feedback scheme of the one or more actually transmitted SPS PDSCHs.

39. The HARQ processing method of claim 38, wherein the HARQ-ACK feedback scheme includes:
skipping HARQ-ACK feedback of a corresponding SPS PDSCH;
transmitting HARQ-ACK feedback of the corresponding SPS PDSCH only if a decoding result of the corresponding SPS PDSCH is ACK; or
transmitting HARQ-ACK feedback of the corresponding SPS PDSCH only if the decoding result of the corresponding SPS PDSCH is NACK.

40. The HARQ processing method of claim 36, wherein the selected one or more SPS PDSCHs are one or more SPS PDSCHs which are actually transmitted on the plurality of periodic SPS PDSCH resources and the selected one or more SPS PDSCHs are indicated by an SPS PDSCH location indication in an RRC configuration or downlink control information (DCI) indication.

41. The HARQ processing method of claim 40, wherein the SPS PDSCH location indication includes a bitmap pattern or an index to the bitmap pattern to indicate one or more locations of the one or more actually transmitted SPS PDSCHs within a pre-determined period of time.

42. The HARQ processing method of claim 41, wherein the pre-determined period of time is configured through an RRC configuration.

43. The HARQ processing method of claim 40, wherein the SPS PDSCH location indication is configured per SPS configuration or per group of SPS configurations.

44. The HARQ processing method of claim 40, wherein the SPS PDSCH location indication includes a transmission periodicity of the one or more actually transmitted SPS PDSCHs.

45. The HARQ processing method of claim 40, wherein the SPS PDSCH location indication includes one or more candidate locations for transmission of the one or more actually transmitted SPS PDSCHs within a pre-determined period of time.

46. The HARQ processing method of claim 36, wherein SPS PDSCHs are transmitted by the base station on every resource of the plurality of periodic SPS PDSCH resources and all the SPS PDSCHs on the plurality of periodic SPS PDSCH resources are the selected one or more SPS PDSCHs.

47. The HARQ processing method of claim 36, wherein the one or more HARQ-ACK bits to be added to the HARQ-ACK codebook are reduced if a feedback reduction condition is satisfied.

48. The HARQ processing method of claim 47, wherein the feedback reduction condition is indicated in DCI or RRC signaling.

49. The HARQ processing method of claim 47, wherein the feedback reduction condition comprises one or more of:
excluding a HARQ-ACK bit for a decoded SPS PDSCH from the HARQ-ACK codebook if a decoding result of the decoded SPS PDSCH is a NACK;
excluding a HARQ-ACK bit for a decoded SPS PDSCH from the HARQ-ACK codebook if a decoding result of the decoded SPS PDSCH is an ACK;
excluding a HARQ-ACK bit for an SPS PDSCH resource from the HARQ-ACK codebook if no SPS PDSCH is actually transmitted on the SPS PDSCH resource;
excluding a HARQ-ACK bit for a decoded SPS PDSCH from the HARQ-ACK codebook if the decoded SPS PDSCH belongs to a specific SPS configuration index; and
excluding a HARQ-ACK bit for a decoded SPS PDSCH from the HARQ-ACK codebook if the decoded SPS PDSCH belongs to a certain priority level.

50. The HARQ processing method of claim 49, wherein the specific SPS configuration index or the certain priority level is indicated in DCI or RRC signaling.

51. The HARQ processing method of claim 36, wherein the one or more HARQ-ACK bits to be added to the HARQ-ACK codebook are reduced based on bundling of the one or more HARQ-ACK bits.

52. The HARQ processing method of claim 51, wherein one or more SPS configurations of periodic SPS PDSCH resources are configured through an RRC signaling, and the one or more HARQ-ACK bits of the one or more SPS PDSCHs that belong to the same group of SPS configurations are bundled and transmitted according to a HARQ-ACK feedback timing.

53. The HARQ processing method of claim 52, wherein the group of SPS configurations belong to the same traffic type.

54. The HARQ processing method of claim 52, wherein configuration of the group of SPS configurations is indicated in DCI or RRC signaling.

55. The HARQ processing method of claim 52, wherein the HARQ-ACK feedback timing of the bundled one or more HARQ-ACK bits is determined based on a HARQ-ACK feedback timing of one SPS configuration in the group of the SPS configurations.

56. The HARQ processing method of claim 52, wherein the one or more HARQ-ACK bits of the one or more SPS PDSCHs that belong to the group of SPS configurations are bundled within a feedback period.

57. The HARQ processing method of claim 51, wherein the one or more HARQ-ACK bits of the one or more SPS PDSCHs that belong to the same SPS configuration are bundled and transmitted according to a HARQ-ACK feedback timing.

58. The HARQ processing method of claim 57, wherein the HARQ-ACK feedback timing is based on an SPS PDSCH location within a feedback period.

59. The HARQ processing method of claim 58, wherein the feedback period is determined according to periodicity of a TDD configuration, and the periodicity of the TDD configuration is periodicity of a downlink-uplink pattern for time-division duplexing (TDD) transmission.

60. The HARQ processing method of claim 58, wherein the feedback period is configured in RRC signaling.

61. The HARQ processing method of claim 36, wherein transmission of the constructed HARQ-ACK codebook is skipped if a feedback skipping condition is satisfied.

62. The HARQ processing method of claim 61, wherein the feedback skipping condition is indicated in DCI or RRC signaling.

63. The HARQ processing method of claim 61, wherein the feedback skipping condition comprises one or more of:
    skipping transmission of the constructed HARQ-ACK codebook if all HARQ-ACK bits in the HARQ-ACK codebook are NACK;
    skipping transmission of the constructed HARQ-ACK codebook if all HARQ-ACK bits in the HARQ-ACK codebook are ACK; and
    skipping transmission of the constructed HARQ-ACK codebook if a number of excluded HARQ-ACK bits in the HARQ-ACK codebook is greater than a threshold.

64. The HARQ processing method of claim 63, wherein the threshold is indicated in DCI or RRC signaling.

65. The HARQ processing method of claim 36, wherein two or more HARQ-ACK codebooks are constructed to include HARQ-ACK bits for SPS PDSCHs on the plurality of periodic SPS PDSCH resources.

66. The HARQ processing method of claim 65, wherein one or more SPS configurations of periodic SPS PDSCH resources are configured through an RRC signaling, and the HARQ-ACK bits for the SPS PDSCHs on the plurality of periodic SPS PDSCH resources are classified and be separately added to the two or more HARQ-ACK codebooks based on one or more of the following schemes:
    HARQ-ACK bits of the same SPS configuration are transmitted in the same HARQ-ACK codebook;
    HARQ-ACK bits of SPS PDSCHs with corresponding DCI scheduling the SPS PDSCHs are transmitted in the same HARQ-ACK codebook;
    HARQ-ACK bits of SPS PDSCHs without corresponding DCI scheduling the SPS PDSCHs are transmitted in the same HARQ-ACK codebook;
    HARQ-ACK bits of SPS PDSCHs belong to the same SPS configuration group or the same SPS PDSCH traffic type are transmitted in the same HARQ-ACK codebook;
    HARQ-ACK bits of SPS PDSCHs with a decoding result of ACK are transmitted in the same HARQ-ACK codebook; and
    HARQ-ACK bits of SPS PDSCHs with a decoding result of NACK are transmitted in the same HARQ-ACK codebook.

67. The HARQ processing method of claim 65, wherein different configurations of feedback timing or different radio resources for HARQ-ACK feedback are adopted for different HARQ-ACK codebooks, and the radio resources for HARQ-ACK feedback comprise PUCCH resources or physical uplink shared channel (PUSCH) resources.

68. A base station comprising:
a processor configured to call and run a computer program stored in a memory, to cause a device in which the chip is installed to execute a method of claim 36.

69. A chip, comprising:
a processor, configured to call and run a computer program stored in a memory, to cause a device in which the chip is installed to execute a method of claim 36.

70. A non-transitory computer-readable storage medium, in which a computer program is stored, wherein the computer program causes a computer to execute a method of claim 36.

* * * * *